(12) United States Patent
McCarty et al.

(10) Patent No.: US 11,321,386 B2
(45) Date of Patent: May 3, 2022

(54) SYSTEMS AND METHODS FOR UPDATING A PRIORITY OF A MEDIA ASSET USING A CONTINUOUS LISTENING DEVICE

(71) Applicant: Rovi Guides, Inc., San Jose, CA (US)

(72) Inventors: Michael McCarty, Agoura Hills, CA (US); Glen E. Roe, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/400,634

(22) Filed: May 1, 2019

(65) Prior Publication Data

US 2019/0258667 A1 Aug. 22, 2019

Related U.S. Application Data

(63) Continuation of application No. 15/602,567, filed on May 23, 2017, now Pat. No. 10,318,578.

(51) Int. Cl.
*G06F 16/632* (2019.01)
*G06F 16/78* (2019.01)
(Continued)

(52) U.S. Cl.
CPC .............. *G06F 16/632* (2019.01); *G06F 3/16* (2013.01); *G06F 16/735* (2019.01); *G06F 16/7867* (2019.01); *G10L 19/265* (2013.01)

(58) Field of Classification Search
CPC ... G10L 15/22; G10L 15/1815; G10L 15/075; G10L 15/142; G10L 15/1822; G10L 15/19; G10L 15/24; G10L 15/265; G10L 15/285; G10L 15/26; G10L 15/30; G10L 19/265; G10L 2015/223; G10L 2015/088; G10L 2015/227; G10L 13/00; G10L 13/043; G10L 13/047; G10L 13/08; G10L 13/10; G10L 21/06; G10L 25/63; G06F 3/167; G06F 3/16; G06F 3/165; G06F 16/632; G06F 16/735; G06F 16/7867; G06F 16/23; G06F 16/24522; G06F 16/3329; G06F 16/41; G06F 16/43; G06F 16/436; G06F 16/438; G06F 16/4393; G06F 16/738;
(Continued)

(56) References Cited

U.S. PATENT DOCUMENTS

| | | | |
|---|---|---|---|
| 10,318,578 B2 * | 6/2019 | McCarty | G06F 16/735 |
| 2011/0004477 A1 * | 1/2011 | Bansal | H04N 5/781 |
| | | | 704/275 |

(Continued)

*Primary Examiner* — Duc Nguyen
*Assistant Examiner* — Alexander L Eljaiek
(74) *Attorney, Agent, or Firm* — Haley Guiliano LLP

(57) ABSTRACT

Systems and methods are described herein for automatically changing the priority of a media asset using a continuous listening device. The system may receive an audio clip of a conversation a user, and then determine whether that conversation relates to any of the programs recorded or scheduled to be recorded on a storage device associated with the user. In response to determining that the media asset does relate to one of the programs recorded or scheduled to be recorded on the storage device, a user profile may be consulted to determine past instances of the user discussing the media asset, and, if a measure of the total number of instances the user discussed the media asset meets a threshold measure, the priority of the media asset may be updated.

18 Claims, 10 Drawing Sheets

| Instances | Frequency (/Day) | Positive - Negative | Recording Priority | Deletion Priority |
|---|---|---|---|---|
| 0 - 1 | 0 - .3 | < -5 | Do Not Record if Conflict | Delete First |
| 2 - 5 | .31 - .5 | -4 - 0 | Notify User of Conflict, if No Response: Do Not Record | Delete Second |
| 6 - 10 | .51 - 2 | 1 - 5 | Notify User of Conflict, If No Response: Record | Nice to Have |
| > 10 | > 2 | > 5 | Always Record | Must Have |

(51) Int. Cl.
*G06F 16/735* (2019.01)
*G06F 3/16* (2006.01)
*G10L 19/26* (2013.01)

(58) Field of Classification Search
CPC .... G06F 16/7844; G06F 17/278; G06F 17/20; G06F 17/21; G06F 17/27; G06F 17/277; G06F 17/2775; G06F 17/2785; G06F 17/279; G06F 17/28; G06F 17/2863; G06F 17/2881; G06F 17/289; H04L 12/2829; H04L 51/00; H04L 65/1089; H04L 67/02; H04L 67/025; H04L 67/06; H04L 67/12; H04L 67/22; H04L 67/306; H04N 21/42203; H04N 21/44218; H04N 21/47217; H04N 21/4394; H04N 21/4828; H04W 4/21; H04W 4/12; H04W 4/14; G11B 27/00; H04M 2201/40
USPC .................. 700/94; 704/E15.043, 235, 257; 707/722, 723
See application file for complete search history.

(56) References Cited

U.S. PATENT DOCUMENTS

2017/0162191 A1* 6/2017 Grost .................... G10L 15/075
2018/0329993 A1* 11/2018 Bedadala ................ G10L 15/22

* cited by examiner

Recordings — 200

| Program Information | Status | Keywords |
|---|---|---|
| Title: Blackwater<br>Series: Game of Thrones<br>Season: 2<br>Episode: 9 | Recording Status: Recorded<br>Old Priority: Delete First<br>New Priority: Must Have | Blackwater, Wildfire, Battle, Stannis, Baratheon, Tyrion, Joffrey, Cersei, Tywin, Lannister, Kings, Landing, Red, Keep... |

| Instances | Frequency (/Day) | Positive - Negative | Recording Priority | Deletion Priority |
|---|---|---|---|---|
| 0 - 1 | 0 - .3 | < -5 | Do Not Record if Conflict | Delete First |
| 2 - 5 | .31 - .5 | -4 - 0 | Notify User of Conflict, if No Response: Do Not Record | Delete Second |
| 6 - 10 | .51 - 2 | 1 - 5 | Notify User of Conflict, if No Response: Record | Nice to Have |
| > 10 | > 2 | > 5 | Always Record | Must Have |

FIG. 3

SYSTEMS AND METHODS FOR UPDATING A PRIORITY OF A MEDIA ASSET USING A CONTINUOUS LISTENING DEVICE

CROSS REFERENCE TO RELATED APPLICATION

This application is a continuation of U.S. patent application Ser. No. 15/602,567, filed May 23, 2017, currently allowed, which is hereby incorporated by reference herein in its entirety.

BACKGROUND

It has become increasingly common for modern consumers to own personal electronic devices incorporating voice recognition technology. Many of these electronic devices have begun to incorporate continuous listening modes, in which these devices are always listening for keywords or trigger phrases to activate natural language understanding processes. While this allows for users to issue verbal commands to the electronic devices to update various settings, it may still be cumbersome to the user to issue specific commands to the device. For example, as a user goes throughout his or her day, he or she may have conversations regarding media assets stored/scheduled to be recorded on the home personal video recorder. A user may not think, or it may be socially unacceptable, to issue a specific command to their electronic device, in the middle of such a conversation, to ensure that these media assets are accessible to the user. Ultimately, this may lead to important programs being deleted or not recorded at all, and in turn frustrate the user.

SUMMARY

Accordingly, systems and methods are described herein for automatically changing the priority of a media asset using a continuous listening device. For example, using a continuous listening device, or multiple continuous listening devices, to determine how frequently, how many times, or how positively a user discusses a media asset to determine what priority said media asset should be assigned alleviates a lot of effort on the part of the user to maintain an accurate list of programs that are important to him or her.

For example, the system may receive an audio clip of a conversation of a user, and then determine whether that conversation relates to any of the programs recorded or scheduled to be recorded on a storage device associated with the user. For example, if the user says "I love Tyrion Lannister," the system may determine that the user was discussing a topic related to a media asset (e.g., episode 9 of season 2 of "Game or Thrones," entitled "Blackwater") by comparing a keyword associated with the media asset (e.g., "Tyrion") to the text of the audio (e.g., the third word "Tyrion"), and determining that there was a match. In response, a user profile may be consulted to determine past instances of the user discussing "Blackwater," and if the frequency, number of instances, or other measure of the total number of instances the user discusses "Blackwater" meets a threshold, the priority of "Blackwater" may be updated. In this way, an importance of the media asset, and thus what priority it should be given, is determined from how often the user discusses the program, circumventing the need for the user to manually update the priority of all of the media assets stored on his or her personal recording device.

These systems and methods may be implemented by a media guidance application (e.g., executed by user equipment associated with the user) that may receive an audio clip of a conversation of a user from a continuous listening device in a passive listening state. The media guidance application may use a natural language understanding process to convert this audio clip into text (e.g., to the text "I love Tyrion Lannister."). The media guidance application may determine a plurality of keywords associated with a media asset stored or scheduled to be stored (e.g., episode 9 of season 2 of "Game or Thrones," entitled "Blackwater") and compare the text translation of the audio clip to the plurality of keywords to determine that at least one of the words in the text matches one of the plurality of keywords (e.g., one keyword may be "Tyrion," which matches the third word of the text). Based on determining this match, indicating that the user was discussing "Blackwater" or a related subject, the media guidance application may update a priority of the first media asset.

In some aspects, a media guidance application may receive, from a continuous listening device, an audio clip of an utterance of a user. The audio clip may have been recorded while the continuous listening device was in a passive listening state. For example, the user may be having a conversation with a friend in which the user says "I love Tyrion Lannister," and the media guidance application may receive an audio clip of the conversation for processing, despite the continuous listening device not receiving a specific prompt to process a command. As used herein, a "continuous listening device" is a device that may, when powered on, be constantly monitoring audio without a user having to prompt (e.g., by pressing a button) the device to prepare for input commands. For example, a continuous listening device may be constantly monitoring audio for a keyword or prompt (e.g., "Hello Assistant") to activate an active listening state or may be constantly monitoring and processing all audio in a passive listening state. As used herein, a "passive listening state" is defined as a mode of operation of a continuous listening device in which the continuous listening device continues to temporarily or persistently record audio, but in which the user has not otherwise prompted the continuous listening device to prepare to receive instructions. In the passive state, the continuous listening device processes all audio input, as opposed to an active listening state, where audio is only processed in response to a keyword or prompt. In some embodiments, the continuous listening device stores audio received in a circular buffer that stores audio for a predetermined listening length. For example, the continuous listening device may store five minutes of audio, where the earliest audio information is deleted as new audio is recorded. In some embodiments, all audio is persistently stored, and may be deleted using routine housekeeping operations or manually by a user.

In some embodiments, the media guidance application may, based on receiving the audio clip, input the audio clip into a natural language understanding process. In some embodiments, the media guidance application may access a subprocess, stored in memory, that converts speech in audio to text, and may input the audio clip into the subprocess after accessing the subprocess from memory. In other embodiments, the media guidance application may transmit the audio clip to a remote server that converts the speech in the audio clip to text. In some embodiments, the media guidance application may receive, as an output of the natural language process, a data structure containing a first plurality of words. For example, the data structure may contain the words "I," "love," "Tyrion," and "Lannister" or may be a single string with the text "I love Tyrion Lannister."

In some embodiments, the media guidance application may retrieve, from memory, a data structure indicating a first media asset currently stored or scheduled to be stored on a storage device associated with the user. For example, the media guidance application may query the memory for any data structure indicating a media asset stored or scheduled to be stored on the storage device. In response, the media guidance application may receive a data structure indicating that the media asset "Blackwater" is already stored on the storage device. Alternatively, the data structure may indicate that "Blackwater" is scheduled to be stored on the storage device. In some embodiments, the media guidance application may extract, from the data structure indicating the first media asset, an indication of the first media asset. For example, the media guidance application may extract, by executing an SQL script utilizing the declarative "Select" command, an indication of "Blackwater" from the data structure indicating "Blackwater" is currently stored or scheduled to be stored on the storage device associated with the user.

In some embodiments, the media guidance application may transmit, based on extracting the indication of the first media asset, to a database, a data packet containing a query for a plurality of keywords associated with the first media asset. For example, the media guidance application may transmit the title "Blackwater" to the server, with a request for keywords associated with "Blackwater."

In some embodiments, the media guidance application may receive, based on transmitting the data packet containing the query to the database, a data packet containing the plurality of keywords associated with the first media asset. For example, the media guidance application may contain a data packet containing the words "Blackwater," "Wildfire," "Stannis," "Baratheon," "Joffry," "Tyrion," "Tywin," "Lannister," "Kings," and "Landing." Alternatively or additionally, the data packet may contain a summary of "Blackwater" or any other textual description of "Blackwater." In some embodiments, the media guidance application may extract, from the data packet, the plurality of keywords associated with the first media asset. For example, the media guidance application may extract, by executing an SQL script utilizing the declarative "Select" command, from the data packet, the keywords "Blackwater," "Wildfire," "Stannis," "Baratheon," "Joffry," "Tyrion," "Tywin," "Lannister," "Kings," and "Landing," which are all associated with "Blackwater."

In some embodiments, the media guidance application may compare the first plurality of words to the plurality of keywords associated with the first media asset to determine whether there is a match between the first plurality of words and the plurality of keywords. For example, the media guidance application may compare "I," "love," "Tyrion," and "Lannister" with the keywords "Blackwater," "Wildfire," "Stannis," "Baratheon," "Joffry," "Tyrion," "Tywin," "Lannister," "Kings," and "Landing." In some embodiments, the media guidance application may determine that this is a match by determining whether at least one of the first plurality of words matches at least one of the plurality of keywords. For example, the media guidance application may search the plurality of keywords to determine if any match with "I," "love," "Tyrion," and "Lannister." The media guidance application may determine that "Tyrion" and "Lannister," as contained in the first plurality of words, match the same words in the plurality of keywords. In some embodiments, the media guidance application may determine that the match indicates that the user was discussing the first media asset. For example, the media guidance application may determine, based on determining that "Tyrion" and "Lannister" are contained in both the first plurality of words and the plurality of keywords, that the user was discussing "Blackwater."

In some embodiments, the media guidance application may, based on determining that there is a match, store, in a user profile associated with the user, a first indication that the user was discussing the first media asset. For example, the media guidance application may store an indication of "Blackwater" in a data structure indicating that the user was discussing "Blackwater." In some embodiments, the media guidance application may also store, in the data structure, an indication of the time at which the audio clip was recorded.

In some embodiments, the media guidance application may, in order to determine which of a plurality of users spoke in the audio clip and thus access the correct user profile, compare the audio clip to a plurality of audio signatures in an audio signature database. The audio signature database may associate each of the plurality of audio signatures with a respective user of the plurality of users. For example, the audio signature database may include an entry for all the members of a household, such as the son, the daughter, the mom, and the dad. The media guidance application may have previously gathered test phrases in order to develop the audio signature for each of the members of the household. The media guidance application may compare the audio clip, and particular characteristics thereof, to the audio signatures to determine whether the son, the daughter, the mom, or the dad spoke in the audio clip.

In some embodiments, the media guidance application may determine, based on comparing the audio clip to the plurality of audio signatures, that the user spoke in the audio clip. For example, the media guidance application may determine that the audio clip most closely matches the audio signature of the daughter, and therefore determine that the daughter spoke in the audio clip. In some embodiments, the media guidance application may access the user profile associated with the user based on determining that the user spoke in the audio clip. For example, the media guidance application may access the user profile associated with the daughter based on determining that the daughter spoke in the audio clip. The media guidance application may thus store the indication that the user was discussing "Blackwater" in the user profile associated with the daughter.

In some embodiments, the media guidance application may search the user profile associated with the user for indications that the user was discussing the first media asset. In some embodiments, in order to search for the indication that the user was discussing the first media asset, the media guidance application may retrieve a plurality of data structures, each data structure representing a respective indication of a plurality of indication that the user was discussing a respective media asset of a plurality of media assets. In some embodiments, the media guidance application may access a field of each of the plurality of data structures indicating the respective media asset of the plurality of media assets to determine which of the plurality of data structures represent an indication that the user was discussing the media asset. For example, the media guidance application may determine that there are a total of five indications that the daughter was discussing "Blackwater" in the user profile associated with the daughter. In some embodiments, the media guidance application may retrieve, from the user profile, at least one indication that the user was discussing the first media asset. For example, the media guidance application may retrieve all five of the data structures representing the five indications that the user was discussing "Blackwater."

In some embodiments, the media guidance application may determine that a measure of a total number of indications that the user was discussing the first media assets meets a threshold measure. The total number of indications includes the at least one indication that the user was discussing the first media asset and the first indication that the user was discussing the first media asset. For example, the media guidance application may determine, based on retrieving the five indications that the user was discussing "Blackwater" and based on determining that the user was discussing the "Blackwater" in the audio clip, that the measure of the total number of indications that the user discussed "Blackwater" is six times.

In some embodiments, the media guidance application may determine the measure by determining a frequency of the user discussing the first media asset, a total number of discussions about the first media asset, or a difference or ratio between how many positive conversations the user has about the first media asset and how many negative conversations the user has about the first media asset. In some embodiments, the media guidance application may determine a frequency that the user discusses the first media asset. The media guidance application may extract, from the at least one indication retrieved from the user profile, a first time stamp. In some embodiments, the each of the at least one indication may comprise a respective time stamp corresponding to a time at which the user discussed the first media asset. For example, the first time stamp may indicate that the user discussed "Blackwater" at 5:00 PM on May 28, 2012.

In some embodiments, the media guidance application may calculate an amount of time between a first time corresponding to the first time stamp and a second time. The second time may correspond to a time at which the audio clip was recorded. In some embodiments, the media guidance application may determine the second time by receiving, from the continuous listening device, an indication of when the audio clip was recorded. For example, the second time may be 5:00 PM on May 30, 2012. The media guidance application may subtract 5:00 PM on May 28, 2012 from 5:00 PM on May 30, 2012 to determine that the amount of time between the first time and the second time is two days.

In some embodiments, the media guidance application may compare the first time and the second time to the plurality of time stamps to determine an amount of time stamps corresponding to times between the first time and the second time. For example, the remaining four indications that the user discussed the first media asset may have occurred at 1:00 PM on May 28, 2012, 2:00 PM on May 29, 2012, 2:30 PM on May 29, 2012, and 3:00 PM on May 30, 2012. The media guidance application may compare each of these times to 5:00 PM on May 28, 2012 and 5:00 PM on May 30, 2012 to determine that three of the remaining four indications that the user discussed "Blackwater" indicate that the user discussed "Blackwater" between the first time and the second time.

In some embodiments, the media guidance application may calculate, based on the amount of time stamps and the amount of time, the frequency. For example, the media guidance application may divide a total of five indications occurring between 5:00 PM on May 28, 2012 and 5:00 PM on May 30, 2012 by two days to determine that the frequency is 2.5 discussions per day.

In some embodiments, the media guidance application may determine the measure by determining a difference between how many positive conversations the user has about the first media asset and how many negative conversations the user has about the first media asset. To do so, in some embodiments, the media guidance application may determine a context of the audio clip. The context of the audio clip may indicate whether the user was speaking positively or negatively about the first media asset. For example, the media guidance application may determine that "I love Tyrion Lannister" indicates that the user was talking positively about "Blackwater." However, the media guidance application may also determine that the user was speaking negatively about the first media asset. For example, if the user had said "I dislike the wildfire storyline," while the user may have been discussing "Blackwater" (as "wildfire" matches with one of the plurality of keywords associated with "Blackwater"), the media guidance application may determine that this audio clip indicates that the user was talking negatively about "Blackwater." In some embodiments, the media guidance application may associate, with the first indication, an indication of the negative context. For example, the media guidance application may create a data structure that contains the indication that the user discussed "Blackwater" and include, in the data structure, an indication that the discussion was a negative context.

In some embodiments, the media guidance application may determine the context of the audio clip by comparing the data structure containing the first plurality of words to a negative word database. The negative word database comprises at least one data structure indicating negating words. For example, the media guidance application may compare the first plurality of words (e.g., in this case, "I," "dislike," "the," "wildfire," "storyline") to the negative word database. In some embodiments, the media guidance application may determine that at least one word of the first plurality of words is contained in the negative word database. For example, the media guidance application may determine that the word "dislike" may be contained in the negative word database. In some embodiments, the media guidance application may associate the indication of a negative context based on determining that at least one word of the first plurality of words is contained in the negative word database. For example, based on determining that the word "dislike" is contained in the negative word database, the media guidance application may associate a negative context with the indication that the user discussed "Blackwater" (i.e., when the user said "I dislike the wildfire storyline").

In some embodiments, the media guidance application may determine the context of the audio clip by comparing the audio clip to a tone database to determine a tone of the audio clip. The tone of the audio clip is a non-etymological indication of whether the user is speaking positively or negatively about the first media asset. For example, the user may, instead of saying "I dislike the wildfire storyline," have simply said, "Oh, Game of Thrones," but with a negative tone. In some embodiments, the media guidance application may determine that the tone of the audio clip is a negative tone based on comparing the audio clip, and characteristics thereof, to the tone database. For example, the media guidance application may determine that the audio clip features slower, more deliberate words, and may cross-reference this with the tone database to determine that the tone of the audio clip is a negative tone. In some embodiments, the media guidance application may associate, with the first indication, the indication of the negative context based on determining that the tone of the audio clip is a negative tone. For example, based on determining that the tone of the audio clip is a negative tone, the media guidance application may associate a negative context with the indication that the user discussed "Blackwater" (i.e., when the user said, "Oh, Game of Thrones").

In some embodiments, as discussed, the media guidance application may determine the measure by determining a difference between a total number of indications associated with the negative context and a total number of indications associated with a positive context. The difference may be greater than zero if the total number of indications associated with the negative context is less than the total number of indications associated with the positive context. For example, the media guidance application may determine that two out of the six indications that the user was discussing "Blackwater" are associated with a negative context and that the remaining four out of the six indications that the user was discussing "Blackwater" are associated with a positive context. The media guidance application may determine that the measure is therefore two, based on four of the indications being associated with a positive context minus the two indications associated with a negative context.

In some embodiments, the media guidance application may include in the calculation of the measure of the total number of indications that the user was discussing the first media asset, discussions regarding the first media asset in which close relations to the user participated. In some embodiments, the media guidance application may access a relationship graph. The relationship graph may indicate a link between the user and a second user. For example, the relationship graph may indicate a link between the daughter (i.e., the user) and the dad (i.e., the second user). In some embodiments, the media guidance application may search a user profile associated with the second user for indications that the second user was discussing the first media asset. For example, the media guidance application may search the user profile associated with the dad to determine that the dad discussed "Blackwater" four times. In some embodiments, the media guidance application may include the indications that the second user was discussing the first media asset in the measure of the total number of indications. For example, the media guidance application may apply a weight of a fourth to the indications that the dad was discussing "Blackwater," therefore increasing the measure of the total number of indications from six indications to seven indications.

In some embodiments, the media guidance application may include, in the calculation of the measure of the total number of indications that the user was discussing the first media asset, indications of all audio clips received from the continuous listening device. In some embodiments, the media guidance application may include only audio clips that contain recognized voices. In some embodiments, the media guidance application may receive, from the continuous listening device, a second audio clip of an utterance of a third user. For example, the mail man may say "the neighborhood is going crazy about Stannis' loss in that last episode," of which the media guidance application may receive an audio clip from the continuous listening device.

In some embodiments, the media guidance application may compare the second audio clip to the plurality of audio signatures in the audio signature database to determine which of a plurality of users spoke in the audio clip. This may be done in a similar manner as described above in relation to accessing the correct user profile associated with the user. In some embodiments, the media guidance application may determine, based on comparing the second audio clip to the plurality of audio signatures, that the second audio clip does not match with any of the plurality of audio signatures. For example, the media guidance application may determine that the voice of the mail man in the second audio clip does not match with any of the audio signatures associated with the son, the daughter, the mom, or the dad. In some embodiments, the media guidance application may determine, based on determining that the second audio clip does not match with any of the plurality of audio signatures, not to include indications that the third user (e.g., the mail man) was discussing the first media asset in the measure of the total number of indications. For example, despite the fact that the mail man may have discussed "Blackwater" on twenty indications, because the mail man is not associated with one of the plurality of audio signatures in the audio signature database, these indications may not be included in the measure of the total number of indication that the daughter discussed "Blackwater," thereby keeping the measure at six indications.

As discussed, in some embodiments, the media guidance application may determine that a measure of a total number of indications that the user was discussing the first media assets meets a threshold measure. For example, the threshold measure may be that the user discussed the media asset more than five times, that the user discussed the media asset more than two times per day, or positively discussed the media asset at least one more time than they negatively discussed the media asset. For example, the media guidance application may determine that the user discussed "Blackwater" six times, as discussed above, and this may meet the threshold measure of the user discussing the media asset more than five times.

In some embodiments, the media guidance application may update a priority, associated with recording, of the first media asset to a first priority at the storage device associated with the user. The first priority may in turn control deletion of the first media asset or control whether the first media asset is recorded in the case of conflict. For example, the media guidance application may update the priority of "Blackwater" from "Nice to Have" to "Must Have" (i.e., the first priority) based on determining that the user discussed "Blackwater" six times, which meets the threshold measure of the user discussing the media asset more than five times. In some embodiments, if the measure is the difference between a total number of indications associated with the negative context and a total number of indications associated with a positive context, the media guidance application may update the priority by increasing the priority to the first priority if the difference is greater than zero (e.g., is greater than the threshold measure) and decreasing the priority to the first priority if the difference is less than zero (e.g., is less than the threshold measure).

In some embodiments, the media guidance application may determine the threshold measure by accessing a database of threshold measures. In some embodiments, the media guidance application may access, from memory, a table associating a plurality of threshold measures with a plurality of priorities. Each threshold measure of the plurality of threshold measures is associated with a respective priority. For example, the table may associate the threshold measure of the user discussing the media asset more than five times with the priority of "Must Have," where the table may associate the threshold measure of the user discussing the media asset between two and four times with a priority of "Nice to Have."

In some embodiments, the media guidance application may determine that the measure of the total number of indications that the user was discussing the first media asset meets the threshold measure comprises comparing the measure to the plurality of threshold measures to determine the threshold measure that includes the measure. For example, the media guidance application may compare the measure that the user discussed "Blackwater" six times with the threshold measure of the user discussing the media asset more than five times, which includes the measure, to determine the threshold measure. In some embodiments, the media guidance application may update the priority by determining the priority corresponding to the threshold measure, where the first priority is set to be the priority corresponding to the threshold measure. For example, the media guidance application may determine that the first priority is "Must Have" because "Must Have" is associated with the threshold measure that the user discussed "Blackwater" more than five times.

In some embodiments, the media guidance application may determine the threshold measure based on an average of the number of times the user watched other shows. In some embodiments, the media guidance application may search the user profile of the user for indications that the user was discussing a second media asset, and may search the user profile for indications that the user was discussing a third media asset. This may be done in a similar manner as described above in relation to searching the user profile for indications that the user was discussing the first media asset. For example, the media guidance application may search for indications that the user discussed the thirteenth episode of the fourth season of the series "Breaking Bad," entitled "Face Off" and for indications that the user discussed the eighth episode of the second season of "Bob's Burgers" entitled "Bad Tina." In some embodiments, the media guidance application may determine a second measure of a second total number of indications that the user was discussing the second media asset and determine a third measure of a third total number of indications that the user was discussing the third media asset. This may be done in a similar manner to determining a measure of a total number of indications that the user was discussing the first media asset, as discussed above. For example, the media guidance application may determine that the second measure is that the user discussed "Face Off" eight times, and that the third measure is that the user discussed "Bad Tina" two times.

In some embodiments, the media guidance application may calculate an average measure based on an average of the second measure and the third measure. For example, the media guidance application may determine that the average measure is an average of the eight times the user discussed "Face Off" and the two times the user discussed "Bad Tina," which may yield an average measure of five times the user discussed "Face Off" and "Bad Tina." In some embodiments, the media guidance application may store, in the user profile, a data structure associating the average measure with the threshold measure. For example, the media guidance application may associate the threshold measure with the average measure of five times the user discussed various media assets in a data structure.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an illustrative example of a graphical representation of a data structure associating a program with a recording status, priority, and a plurality of keywords, in accordance with some embodiments of the disclosure;

FIG. 3 shows an illustrative example of a graphical representation of a table associating a plurality of threshold measures with a plurality of priorities, in accordance with some embodiments of the disclosure;

DETAILED DESCRIPTION

Systems and methods are described herein for automatically changing the priority of a media asset using a continuous listening device. For example, using a continuous listening device, or multiple continuous listening devices, to determine how frequently, how many times, or how positively a user discusses a media asset to determine what priority said media asset should be assigned alleviates a lot of effort on the part of the user to maintain an accurate list of programs that are important to him or her.

For example, the system may receive an audio clip of a conversation of a user, and then determine whether that conversation relates to any of the programs recorded or scheduled to be recorded on a storage device associated with the user. For example, if the user says "I love Tyrion Lannister," the system may determine that the user was discussing a topic related to a media asset (e.g., episode 9 of season 2 of "Game or Thrones," entitled "Blackwater") by comparing a keyword associated with the media asset (e.g., "Tyrion") to the text of the audio (e.g., the third word "Tyrion"), and determining that there was a match. In response, a user profile may be consulted to determine past instances of the user discussing "Blackwater," and if the frequency, number of instances, or other measure of the total number of instances the user discusses "Blackwater" meets a threshold, the priority of "Blackwater" may be updated. In this way, an importance of the media asset, and thus what priority it should be given, is determined from how often the user discusses the program, circumventing the need for the user to manually update the priority of all of their media assets stored on their personal recording device.

These systems and methods may be implemented by a media guidance application (e.g., executed by user equipment associated with the user), which may receive an audio clip of a conversation of a user from a continuous listening device in a passive listening state. The media guidance application may use a natural language understanding process to convert this audio clip into text (e.g., to the text "I love Tyrion Lannister."). The media guidance application may determine a plurality of keywords associated with a media asset stored or scheduled to be stored (e.g., episode 9 of season 2 of "Game or Thrones," entitled "Blackwater") and compare the text translation of the audio clip to the plurality of keywords to determine that at least one of the words in the text match one of the plurality of keywords (e.g., one keyword may be "Tyrion," which matches the third word of the text). Based on determining this match, indicating that the user was discussing "Blackwater" or a related subject, the media guidance application may update a priority of the first media asset.

Figure 1:
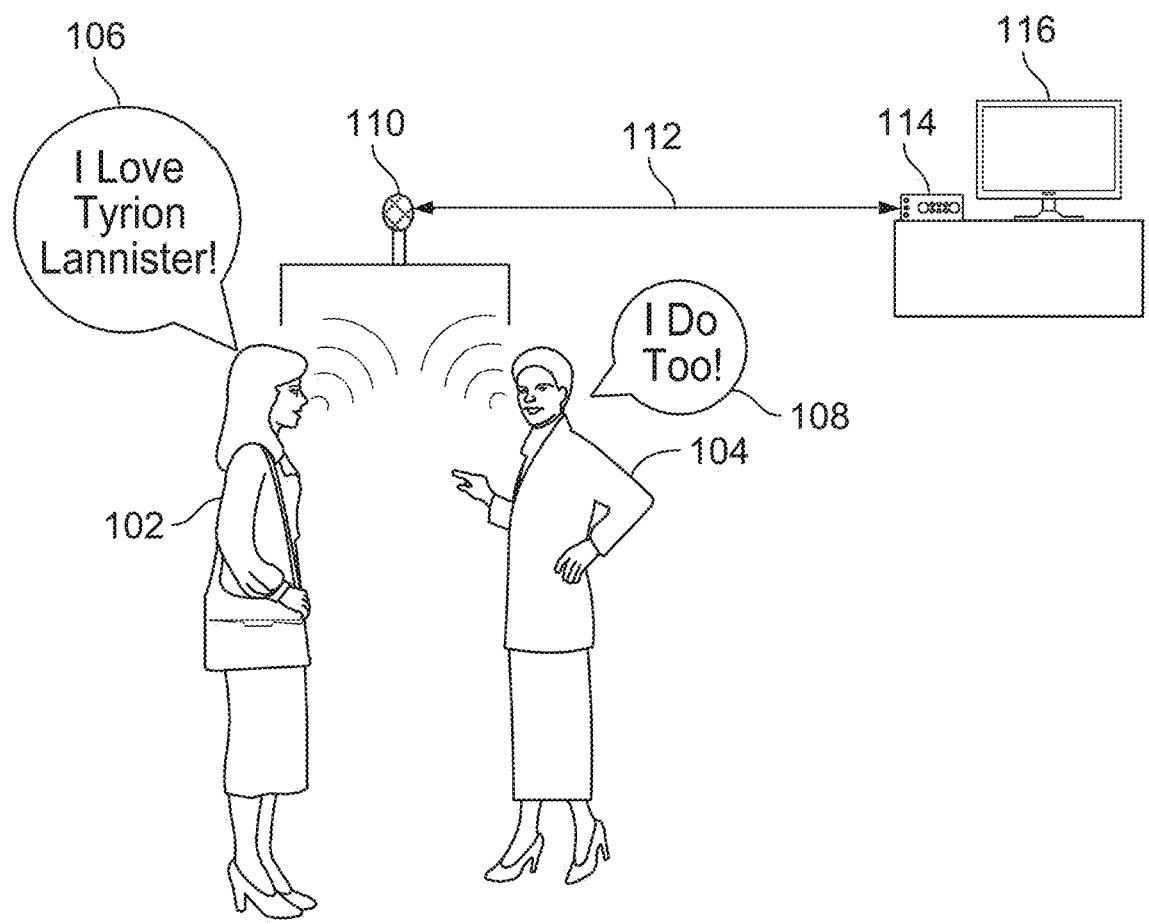
FIG. 1 shows an illustrative block diagram for changing a recording priority of a media asset using a continuous listening device, in accordance with some embodiments of the disclosure.

FIG. 1 shows an illustrative block diagram for changing a recording priority of a media asset using a continuous listening device, in accordance with some embodiments of the disclosure. For example, user 202 may speak utterance 106 (i.e., "I love Tyrion Lannister!") in a conversation with user 104. User 104 may reply with utterance 108 (i.e., "I do too!") Continuous listening device 110 may detect utterance 106 and utterance 108. Detector 110 may be such as a camera, wearable camera, wearable technology, microphone, intelligent personal assistant device (e.g., Alexa implemented on the Amazon Echo, Siri implemented on the Apple iPhone, Google Assistant implemented on Google Home, or Cortana implemented on a Microsoft Device), mobile device, or any other suitable detector for detecting utterance 106 and utterance 108. Continuous listening device 110 may communicate with user device 114 over communications link 112. Finally, user device 114 may generate for display menus and other information on display 116.

In some embodiments, a media guidance application, which may be implemented on user device 114, may receive, from continuous listening device 110, an audio clip of utterance 106 from user 102. The audio clip of utterance 106 may have been recorded while the continuous listening device 110 was in a passive listening state. For example, user 102 may be having a conversation with user 104 in which user 102 says utterance 106. The media guidance application implemented at least partially on user device 114 may receive an audio clip of utterance 106 and utterance 108 over communications link 112, despite continuous listening device 110 not receiving a specific prompt to process a command. As used herein, a "continuous listening device" is a device that may, when powered on, be constantly monitoring audio without a user having to prompt (e.g., by pressing a button) the device to prepare for input commands. For example, continuous listening device 110 may be constantly monitoring audio for a keyword or prompt (e.g., "Hello Assistant") to activate an active listening state, or may be constantly monitoring and processing all audio in a passive listening state. As used herein, a "passive listening state" is defined as a mode of operation of continuous listening device 110 in which the continuous listening device 110 continues to temporarily or persistently record audio, but in which the user has not otherwise prompted continuous listening device 110 to prepare to receive instructions. In the passive state, continuous listening device 110 processes all audio input, as opposed to an active listening state, where audio is only processed in response to a keyword or prompt. In some embodiments, the continuous listening device stores audio received in a circular buffer that stores audio for a predetermined listening length. For example, the continuous listening device may store five minutes of audio, where the earliest audio information is deleted as new audio is recorded. In some embodiments, all audio is persistently stored, and may be deleted using routine housekeeping operations or manually by a user.

In some embodiments, the media guidance application implemented on user device 114 may, based on receiving the audio clip of utterance 106, input the audio clip into a natural language understanding process. In some embodiments, the media guidance application implemented on user device 114 may access a subprocess, stored in memory of user device 114, that converts speech in audio to text, and may input the audio clip of utterance 106 into the subprocess after accessing the subprocess from the memory of user device 114. In other embodiments, the media guidance application implemented on user device 114 may transmit the audio clip of utterance 106 to a remote server that converts the speech in the audio clip of utterance 106 to text. In some embodiments, the media guidance application implemented on user device 114 may receive, as an output of the natural language process, a data structure containing a first plurality of words representing utterance 106. For example, the data structure may contain the words "I," "love," "Tyrion," and "Lannister" or may be a single string with the text "I love Tyrion Lannister."

Referring now to FIG. 2, FIG. 2 shows an illustrative example of a graphical representation of a data structure associating a program with a recording status, priority, and a plurality of keywords, in accordance with some embodiments of the disclosure. For example, data structure 202 may include program information field 204, which may include program information 210, including the title of media asset 212. Data structure 202 may additionally include status field 206, which may include status information 214. Status information 214 may include recording status 216, old priority 218, and new priority 220. Note that status information 214 may include only one of old priority 218 and new priority 220. New priority 220 may be determined as described below in relation to FIG. 1 and in relation to FIG. 3. Data structure 202 may further include keywords field 208, which may include keywords 222.

In some embodiments, the media guidance application may retrieve, from memory (e.g., memory of user device 114 of FIG. 1), data structure 202 indicating media asset 212 currently stored or scheduled to be stored on a storage device (e.g., storage device of user device 114 of FIG. 1). For example, the media guidance application may query the memory for any data structure indicating media assets stored or scheduled to be stored on the storage device. In response, the media guidance application may receive data structure 202 indicating media asset 212 and recording status 216 (i.e., that media asset 212 is "recorded"). Alternatively, recording status 216 may indicate that "Blackwater" is scheduled to be stored on the storage device. In some embodiments, the media guidance application may extract, from data structure 202, an indication of the media asset 212.

For example, the media guidance application may extract, by executing an SQL script utilizing the declarative "Select" command, an indication of media asset 212 from data structure 202 indicating that media asset 212 has recording status 216.

In some embodiments, the media guidance application, which may be implemented on user device 114 of FIG. 1, may transmit, based on extracting the indication of media asset 212 from data structure 202, to a database, a data packet containing a query for keywords 222 associated with media asset 212. For example, the media guidance application may transmit the title of media asset 212 to the server, with a request for keywords 222 associated with media asset 212. In other embodiments, the media guidance application may access keywords field 208 of data structure 202 from the memory to determine keywords 222.

In some embodiments, the media guidance application may receive, based on transmitting the data packet containing the query for keywords 222 associated with media asset 212 to the database, a data packet containing keywords 222 associated with media asset 212. For example, the media guidance application may contain a data packet containing keywords 222 (i.e., "Blackwater," "Wildfire," "Battle," "Stannis," "Baratheon," "Tyrion," "Joffry," "Cersei," "Tywin," "Lannister," "Kings," "Landing," "Red," and "Keep"). Alternatively or additionally, the data packet or keywords field 208 may contain a summary of media asset 212 or any other textual description of media asset 212, which may be parsed for keywords 222. In some embodiments, the media guidance application may extract, from the data packet, the keywords 222 associated with media asset 212. For example, the media guidance application may extract, by executing an SQL script utilizing the declarative "Select" command, from the data packet, keywords 222, which are all associated with media asset 212.

Returning now to FIG. 1, in some embodiments, the media guidance application may compare the first plurality of words representing utterance 106 (i.e., "I," "love," "Tyrion," and "Lannister") to the plurality of keywords (e.g., keywords 222 of FIG. 2) associated with a first media asset (e.g., media asset 212 of FIG. 2) to determine whether there is a match between the first plurality of words and the plurality of keywords. For example, the media guidance application implemented on user device 114 may compare "I," "love," "Tyrion," and "Lannister" with the keywords "Blackwater," "Wildfire," "Battle," "Stannis," "Baratheon," "Tyrion," "Joffry," "Cersei," "Tywin," "Lannister," "Kings," "Landing," "Red," and "Keep." In some embodiments, the media guidance application implemented on user device 114 may determine that this is a match by determining whether at least one of the first plurality of words representing utterance 106 matches at least one of the plurality of keywords. For example, the media guidance application implemented on user device 114 may search the plurality of keywords representing utterance 106 to determine if any match with "I," "love," "Tyrion," and "Lannister." The media guidance application implemented on user device 114 may determine that "Tyrion" and "Lannister," as contained in the first plurality of words representing utterance 106 match the same words in the plurality of keywords. In some embodiments, the media guidance application may determine that the match indicates that user 102 was discussing the first media asset. For example, the media guidance application may determine, based on determining that "Tyrion" and "Lannister" are contained in both the first plurality of words representing utterance 106 and the plurality of keywords, that the user was discussing "Blackwater" (i.e., media asset 212 of FIG. 2).

In some embodiments, the media guidance application may identify multiple programs or series with keywords that match the first plurality of words representing utterance 106. For example, the media guidance application may have recorded or scheduled to record, on user device 114, multiple "Game of Thrones" episodes that all have "Tyrion" and "Lannister" as keywords. In these embodiments, the media guidance application may gather additional audio clips of additional utterances of user 102 and user 104 from continuous listening device 110 to determine additional pluralities of words and compare these pluralities of words to keywords or summaries for the multiple programs to further narrow which of the multiple programs user 102 is discussing. For example, the media guidance application may determine that "Blackwater," "A Man Without Honor," and "The Prince of Winterfell" are all recorded on user device 114, and may all have keywords associated therewith that include "Tyrion" and "Lannister." User 102 may proceed to say "His use of wildfire was amazing." The media guidance application may determine that only "Blackwater" has a keyword of "Wildfire" and therefore determine that the user was discussing "Blackwater" and not "A Man Without Honor" or "the Prince of Winterfell" based on this second match.

In some embodiments, the media guidance application implemented on user device 114 may, based on determining that there is a match, store, in a user profile associated with user 102, a first indication that the user was discussing the first media asset. For example, the media guidance application may store an indication of "Blackwater" in a data structure indicating that user 106 was discussing "Blackwater." In some embodiments, the media guidance application may also store, in the data structure, an indication of the time at which the audio clip of utterance 106 was recorded. The user profile may be stored locally at user device 114 or remotely at a remote server.

In some embodiments, the media guidance application implemented on user device 114 may, in order to determine which of user 102 and user 104 spoke in the audio clip of utterance 106 and thus access the correct user profile, compare the audio clip of utterance 106 to a plurality of audio signatures in an audio signature database, which may be stored at user device 114 or stored remotely at a remote server. The audio signature database may associate each of the plurality of audio signatures with a respective user of the plurality of users. For example, the audio signature database may include an entry for user 102 and an entry for user 104. The media guidance application may have previously gathered test phrases in order to develop the audio signature for each of user 102 and user 104. The media guidance application may compare the audio clip of utterance 106, and particular characteristics thereof, to the audio signatures to determine whether user 102 or user 104 spoke utterance 106.

In some embodiments, the media guidance application implemented on user device 114 may determine, based on comparing the audio clip of utterance 106 to the plurality of audio signatures, that user 106 spoke in the audio clip of utterance 106. For example, the media guidance application may determine that the audio clip of utterance 106 most closely matches the audio signature of user 102 using various probability systems, and therefore determine that user 102 spoke in the audio clip of utterance 106. In some embodiments, the media guidance application may access the user profile associated with user 102 based on determining that user 102 spoke in the audio clip of utterance 106.

The media guidance application may thus store the indication that user 102 was discussing "Blackwater" in the user profile associated with user 102.

In some embodiments, the media guidance application implemented on user device 114 may search the user profile associated with user 102 for indications that user 102 was discussing the first media asset. More details on searching the user profile are presented below in relation to FIG. 11. For example, the media guidance application may determine that there are a total of five indications user 102 was discussing "Blackwater" in the user profile associated with user 102. In some embodiments, the media guidance application may retrieve, from the user profile, at least one indication that user 102 was discussing the first media asset. For example, the media guidance application may retrieve all five of the data structures representing the five indications that user 102 was discussing "Blackwater."

In some embodiments, the media guidance application implemented on user device 114 may determine that a measure of a total number of indications that user 102 was discussing the first media assets meets a threshold measure. The total number of indications includes the at least one indication that user 102 was discussing the first media asset and the indication that user 102 was discussing "Blackwater" in the audio clip of utterance 106. For example, the media guidance application may determine, based on retrieving the five indications that user 102 was discussing "Blackwater" and based on determining that user 102 was discussing "Blackwater" in the audio clip of utterance 106, that the measure of the total number of indications that user 102 discussed "Blackwater" is six.

In some embodiments, the media guidance application implemented on user device 114 may include in the calculation of the measure of the total number of indications that user 102 was discussing the first media asset, discussions regarding the first media asset in which close relations (e.g., user 104) to the user participated. In some embodiments, the media guidance application may access a relationship graph. The relationship graph may indicate a link between user 102 and user 104. In some embodiments, the media guidance application may search a user profile associated with user 104 for indications that user 104 was discussing the first media asset. For example, the media guidance application may search the user profile associated with user 104 to determine that user 104 discussed "Blackwater" four times. The media guidance application may include, in the four times, utterance 108 based on receiving an audio clip of utterance 108. The media guidance application may analyze the audio clip of utterance 108, in conjunction with utterance 106, to determine that user 104 was discussing the first media asset (i.e., "Blackwater").

In some embodiments, the media guidance application may include the indications that user 104 was discussing the first media asset in the measure of the total number of indications. For example, the media guidance application may apply a weight of a fourth to the indications that user 104 was discussing "Blackwater," therefore increasing the measure of the total number of indications from six indications to seven indications.

In some embodiments, the media guidance application implemented on user device 114 may include in the calculation of the measure of the total number of indications that the user was discussing the first media asset, indications of all audio clips received from continuous listening device 110. For example, the media guidance application may include an indication that user 104 was discussing the first media asset in utterance 108. In some embodiments, the media guidance application may include only audio clips that contain recognized voices. In some embodiments, the media guidance application may receive, from continuous listening device 110 over communications link 112, a second audio clip of utterance 108 of user 104. For example, user 104 may say "I do too" in utterance 108, of which the media guidance application may receive an audio clip from continuous listening device 110.

In some embodiments, the media guidance application implemented on user device 114 may compare the second audio clip of utterance 104 to the plurality of audio signatures in the audio signature database to determine which of a plurality of users spoke in the audio clip. This may be done in a similar manner as described above in relation to accessing the correct user profile associated with user 102. In some embodiments, the media guidance application may determine, based on comparing the second audio clip to the plurality of audio signatures, that the second audio clip of utterance 108 does not match with any of the plurality of audio signatures. For example, the media guidance application may determine that the voice of user 104 in the second audio clip of utterance 108 does not match with any of the audio signatures associated with user 102 and his family.

In some embodiments, the media guidance application may, based on determining that the second audio clip of utterance 108 does not match with any of the plurality of audio signatures, not to include indications that user 104 (e.g., the mail man) was discussing the first media asset in the measure of the total number of indications. For example, despite the fact that user 104 may have discussed "Blackwater" on twenty indications, or discussed "Blackwater" in utterance 108, because user 104 is not associated with one of the plurality of audio signatures in the audio signature database, these indications may not be included in the measure of the total number of indications that user 102 discussed "Blackwater," thereby keeping the measure at six indications.

As discussed, in some embodiments, the media guidance application implemented on user device 114 may determine that a measure of a total number of indications that user 102 was discussing the first media assets meets a threshold measure. For example, the threshold measure may be that user 102 discussed the first media asset more than five times, that user 102 discussed the media asset more than two times per day, or positively discussed the first media asset at least one more time than they negatively discussed the first media asset. For example, the media guidance application may determine that user 102 discussed "Blackfire" six times, as discussed above, and this may meet the threshold measure of user 102 discussing the media asset more than five times.

In some embodiments, the media guidance application implemented on user device 114 may update a priority (e.g., old priority 218 of FIG. 2), associated with recording, of the first media asset to a first priority (e.g., new priority 220 of FIG. 2) at the storage device of user device 114 associated with user 102. The first priority may in turn control deletion of the first media asset or control whether the first media asset is recorded in the case of conflict. For example, the media guidance application implemented on user device 114 may update the priority of "Blackwater" from "Nice to Have" to "Must Have" based on determining that user 102 discussed "Blackwater" six times, which meets the threshold measure of user 102 discussing the first media asset more than five times. More details on determining the threshold measure and updating the priority are presented below in relation to FIG. 3 and FIG. 12.

FIG. 3 shows an illustrative example of a graphical representation of a table associating a plurality of threshold measures with a plurality of priorities, in accordance with some embodiments of the disclosure. Table 302 may contain one or more types of threshold measures. For example, table 302 contains instances thresholds 304, frequency thresholds 306, positive-negative thresholds 308. Instances thresholds 304 indicate threshold measures for how many distinct instances the user discussed the program. Frequency thresholds 306 indicate threshold measures for how many instances per unit time (e.g., per day) the user discussed the program. Finally, positive-negative thresholds 308 indicate a difference between the number of instances during which the user spoke positively about the program and the number of instances the user spoke negatively about the program, where the difference is positive if the user spoke positively about the program in more instances than the user spoke negatively about the program.

Table 302 correlates these thresholds with recording priorities 310 and deletion priorities 312. Recording priorities 310 may indicate the importance of recording a program that is scheduled to be stored, and deletion priorities may indicate the importance of maintaining a stored copy of a program that is already stored, or may indicate in what order such a copy should be deleted. Instances thresholds 304, frequency thresholds 306, and positive-negative thresholds 308 correlate to recording priorities 310 and deletion priorities 312 if they are in the same row of table 302.

In some embodiments, the media guidance application may determine the threshold measure, as discussed in relation to determining that the measure of the number of indications exceeds the threshold measure in the discussion of FIG. 1 above, by accessing a database of threshold measures. In some embodiments, the media guidance application may access, from memory (e.g., of user device 114 or of a remote server), table 302.

In some embodiments, the media guidance application may determine that the measure of the total number of indications that the user was discussing the first media asset, as discussed in relation to FIG. 1, meets the threshold measure by comparing the measure to instances thresholds 304, frequency thresholds 306, or positive-negative thresholds 308 to determine the threshold measure that includes the measure. For example, the media guidance application may compare the measure that the user discussed "Blackwater" six times with instances thresholds 302 to determine the instance threshold of the user discussing the media asset between six and ten times, which includes the measure of the user discussing the media asset six times, to determine the threshold measure.

In some embodiments, the media guidance application may update the priority by determining which of the recording priorities 310 or the deletion priorities 312 corresponds to the threshold measure of the user discussing the media asset between six and ten times, the third of instances thresholds 304. The first priority is set to be the recording priority of recording priorities 310 or deletion priority of deletion priorities 312 that corresponds to the threshold measure of instances thresholds 304. For example, the media guidance application may determine that the first priority is "Nice to Have" because "Nice to Have" is associated with the threshold measure of the user discussing the media asset six to ten times of instances threshold 304.

The media guidance application may determine instances thresholds 304, frequency thresholds 306, and/or positive-negative thresholds 308 based on an average of the number of times the user watched other shows. In some embodiments, the media guidance application may search the user profile of the user (e.g., user 102 of FIG. 1) for indications that the user was discussing a second media asset, and may search the user profile for indications that the user was discussing a third media asset. This may be done in a similar manner as described above in relation to FIG. 1 and to searching the user profile for indications that the user was discussing the first media asset, and which will be discussed further below in relation to FIG. 11. For example, the media guidance application may search for indications that the user discussed the thirteenth episode of the fourth season of the series "Breaking Bad," entitled "Face Off," and for indications that the user discussed the eighth episode of the second season of "Bob's Burgers" entitled "Bad Tina." In some embodiments, the media guidance application may determine a second measure of a second total number of indications that the user was discussing the second media asset and determine a third measure of a third total number of indications that the user was discussing the third media asset. This may be done in a similar manner to determining a measure of a total number of indications that the user was discussing the first media asset, as discussed above in relation to FIG. 1. For example, the media guidance application may determine that the second measure is that the user discussed "Face Off" eight times, and that the third measure is that the user discussed "Bad Tina" four times.

In some embodiments, the media guidance application may calculate an average measure based on an average of the second measure and the third measure. For example, the media guidance application may determine that the average measure is an average of the eight times the user discussed "Face Off" and the two times the user discussed "Bad Tina," which may yield an average measure of six times the user discussed "Face Off" and "Bad Tina." In some embodiments, the media guidance application may store, in the user profile, table 302, associating the average measure with the threshold measure. For example, the media guidance application may associate the threshold measure with the average measure of six times the user discussed various media assets in table 302. For example, the average measure may be the lower bound of the third of instances thresholds 304, which may be correlated to the third of recording priorities 310 "Notify User of Conflict, if No Response: Record" and with the third of deletion priorities 312 "Nice to Have."

The media guidance application may further calculate a statistical deviation based on the second and third measures, and populate table 302 based on the statistical deviation. For example, the first of recording priorities 310 and the first of deletion priorities 312 may be correlated with a threshold measure of instances 304 of numbers greater than one deviation less than the average measure, the second of recording priorities 310 and the second of deletion priorities 312 may be correlated with a threshold measure of instances 304 of numbers between one deviation and zero deviations less than the average measure, the third of recording priorities 310 and the third of deletion priorities 312 may be correlated with a threshold measure of instances 304 of numbers between zero deviations and one deviation above the average measure, and the fourth of recording priorities 310 and the fourth of deletion priorities 312 may be correlated with a threshold measure of instances 304 of numbers greater than one deviation above the average measure. For example, in table 302, the average measure may be 6, and the standard deviation may be 4. One of ordinary skill in the art may understand that other statistical measures may be used to populate the table, and that other association schemes may be used.

In order to determine which of frequency thresholds 306 the measure meets, the media guidance application may determine the measure by determining a frequency of the user (e.g., user 102) discussing the first media asset (e.g., "Blackwater"). As such, in some embodiments, the media guidance application may determine a frequency that the user discusses the first media asset. The media guidance application may extract, from the at least one indication retrieved from the user profile, as described in relation to FIG. 1, a first time stamp. In some embodiments, the each of the at least one indication may comprise a respective time stamp corresponding to a time at which the user discussed the first media asset. For example, the first time stamp may indicate that the user discussed "Blackwater" at 5:00 PM on May 28, 2012.

In some embodiments, the media guidance application may calculate an amount of time between a first time corresponding to the first time stamp and a second time. The second time may correspond to a time at which the audio clip (e.g., the audio clip of utterance 106) was recorded. In some embodiments, the media guidance application may determine the second time by receiving, from the continuous listening device, an indication of when the audio clip was recorded. For example, the second time may be 5:00 PM on May 30, 2012. The media guidance application may subtract 5:00 PM on May 28, 2012 from 5:00 PM on May 30, 2012 to determine that the amount of time between the first time and the second time is two days.

In some embodiments, the media guidance application may compare the first time and the second time to the plurality of time stamps to determine an amount of time stamps corresponding to times between the first time and the second time. For example, the remaining four indications that the user discussed the first media asset may have occurred at 1:00 PM on May 28, 2012, 2:00 PM on May 29, 2012, 2:30 PM on May 29, 2012, and 3:00 PM on May 30, 2012. The media guidance application may compare each of these times to 5:00 PM on May 28, 2012 and 5:00 PM on May 30, 2012 to determine that three of the remaining four indications that the user discussed "Blackwater" indicate that the user discussed "Blackwater" between the first time and the second time.

In some embodiments, the media guidance application may calculate, based on the amount of time stamps and the amount of time, the frequency. For example, the media guidance application may divide a total of five indications occurring between 5:00 PM on May 28, 2012 and 5:00 PM on May 30, 2012 by two days to determine that the frequency is 2.5 discussions per day. The media guidance application may compare the frequency of 2.5 to frequency thresholds 306 to determine that the updated recording priority of recording priorities 310 is "Must Have," which correlates to the threshold measure of greater than two times per day of frequency thresholds 306.

In order to determine which of positive-negative thresholds 308 the measure meets, in some embodiments, the media guidance application may determine the measure by determining a difference between how many positive conversations the user has about the first media asset and how many negative conversations the user has about the first media asset. To do so, in some embodiments, the media guidance application (e.g., implemented on user device 114 of FIG. 1) may determine a context of the audio clip (e.g., the audio clip of utterance 106 of FIG. 1). The context of the audio clip may indicate whether the user was speaking positively or negatively about the first media asset. For example, the media guidance application may determine that "I love Tyrion Lannister" indicates that the user was talking positively about "Blackwater." However, the media guidance application may also determine that the user was speaking negatively about the first media asset. For example, if the user had said "I dislike the wildfire storyline," while the user may have been discussing "Blackwater" (as "wildfire" matches with one of the plurality of keywords associated with "Blackwater," as discussed in relation to FIG. 1), the media guidance application may determine that this audio clip indicates that the user was talking negatively about "Blackwater." In some embodiments, the media guidance application may associate, with the first indication, an indication of the negative context. For example, the media guidance application may create a data structure that contains the indication that the user discussed "Blackwater" and include, in the data structure, an indication that the discussion was a negative context.

In some embodiments, the media guidance application may determine the context of the audio clip by comparing the data structure containing the first plurality of words to a negative word database. The negative word database comprises at least one data structure indicating negating words. For example, the media guidance application may compare the first plurality of words (e.g., in this case, "I," "dislike," "the," "wildfire," "storyline") to the negative word database. In some embodiments, the media guidance application may determine that at least one word of the first plurality of words is contained in the negative word database. For example, the media guidance application may determine that the word "dislike" may be contained in the negative word database. In some embodiments, the media guidance application may associate the indication of a negative context based on determining that at least one word of the first plurality of words is contained in the negative word database. For example, based on determining that the word "dislike" is contained in the negative word database, the media guidance application may associate a negative context with the indication that the user discussed "Blackwater" (i.e., when the user said "I dislike the wildfire storyline").

In some embodiments, the media guidance application may determine the context of the audio clip by comparing the audio clip to a tone database to determine a tone of the audio clip. The tone of the audio clip is a non-etymological indication of whether the user is speaking positively or negatively about the first media asset. For example, the user may, instead of saying "I dislike the wildfire storyline," have simply said, "Oh, Game of Thrones," but with a negative tone. In some embodiments, the media guidance application may determine that the tone of the audio clip is a negative tone based on comparing the audio clip, and characteristics thereof, to the tone database. For example, the media guidance application may determine that the audio clip features slower, more deliberate words, and may cross-reference this with the tone database to determine that the tone of the audio clip is a negative tone. In some embodiments, the media guidance application may associate, with the first indication, the indication of the negative context based on determining that the tone of the audio clip is a negative tone. For example, based on determining that the tone of the audio clip is a negative tone, the media guidance application may associate a negative context with the indication that the user discussed "Blackwater" (i.e., when the user said, "Oh, Game of Thrones").

In some embodiments, as discussed, the media guidance application may determine the measure by determining a difference between a total number of indications associated with the negative context and a total number of indications associated with a positive context. The difference may be greater than zero if the total number of indications associated with the negative context is less than the total number of indications associated with the positive context. For example, the media guidance application may determine that two out of the six indications that the user was discussing "Blackwater" are associated with a negative context and that the remaining four out of the six indications that the user was discussing "Blackwater" are associated with a positive context. The media guidance application may determine that the measure is therefore two, based on four of the indications being associated with a positive context minus the two indications associated with a negative context.

In some embodiments, the media guidance application may compare the difference to positive-negative thresholds 308 to determine that the updated recording priority of recording priorities 310 is "Nice to Have," which correlates to the threshold measure of between one and five of positive-negative thresholds 308.

In some embodiments, if the measure is the difference between a total number of indications associated with the negative context and a total number of indications associated with a positive context, the media guidance application may update the priority by increasing the priority to the first priority if the difference is greater than zero (e.g., is greater than the threshold measure) and decreasing the priority to the first priority if the difference is less than zero (e.g., is less than the threshold measure). Note that the media guidance application may use a single threshold, as opposed to table 302, for all comparisons between the measure and the threshold measure. The media guidance application may determine if the measure meets the single threshold, and the media guidance application may raise the priority by a single unit (e.g., from "Nice to Have" to "Must Have"). If the media guidance application determines that the measure does not meet the single threshold, the priority may be lowered by a single unit (e.g., from "Notify User of Conflict, if No Response: Do Not Record" to "Do Not Record if Conflict."

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
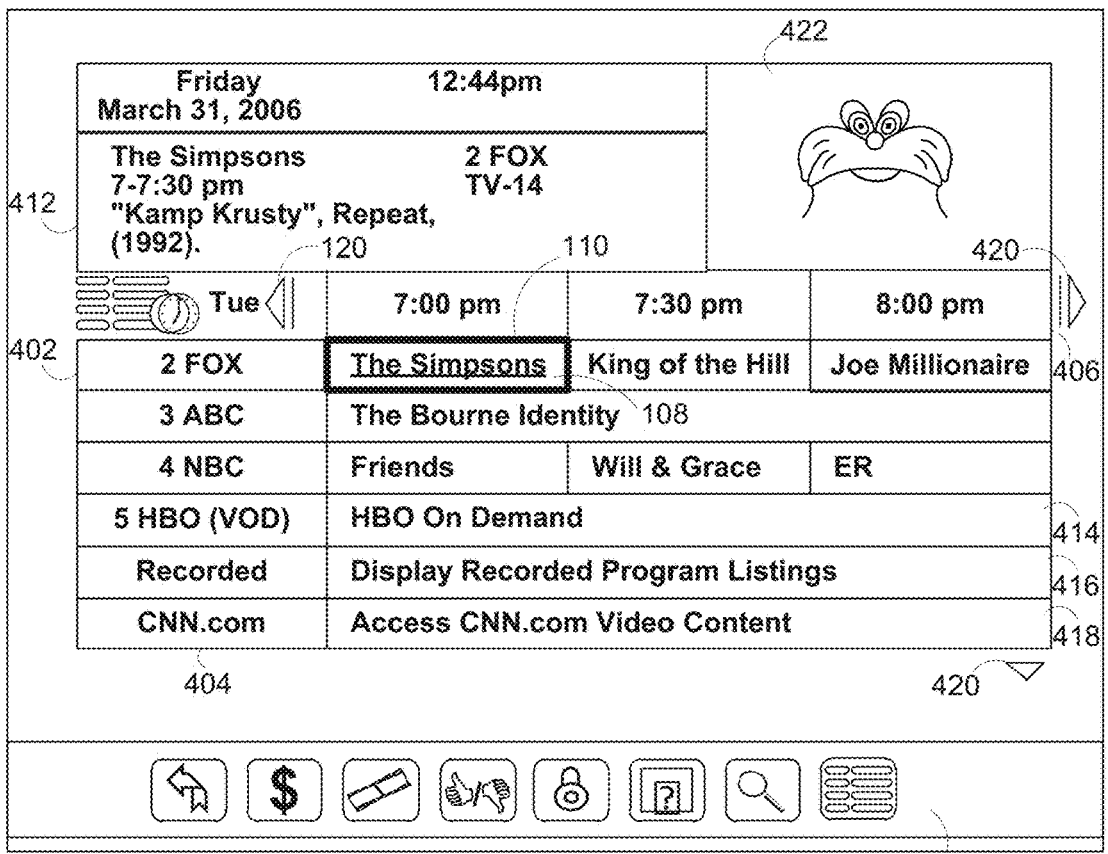
FIG. 4 shows an illustrative example of a display screen for use in accessing media content, in accordance with some embodiments of the disclosure.
Figure 5:
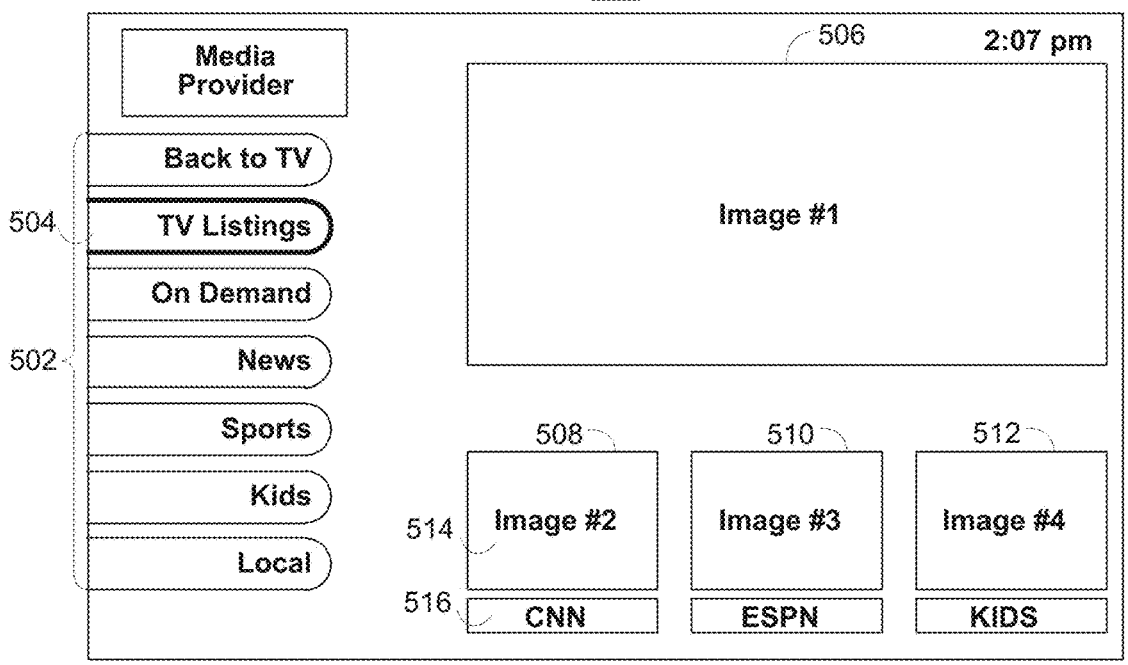
FIG. 5 shows another illustrative example of a display screen used in accessing media content, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
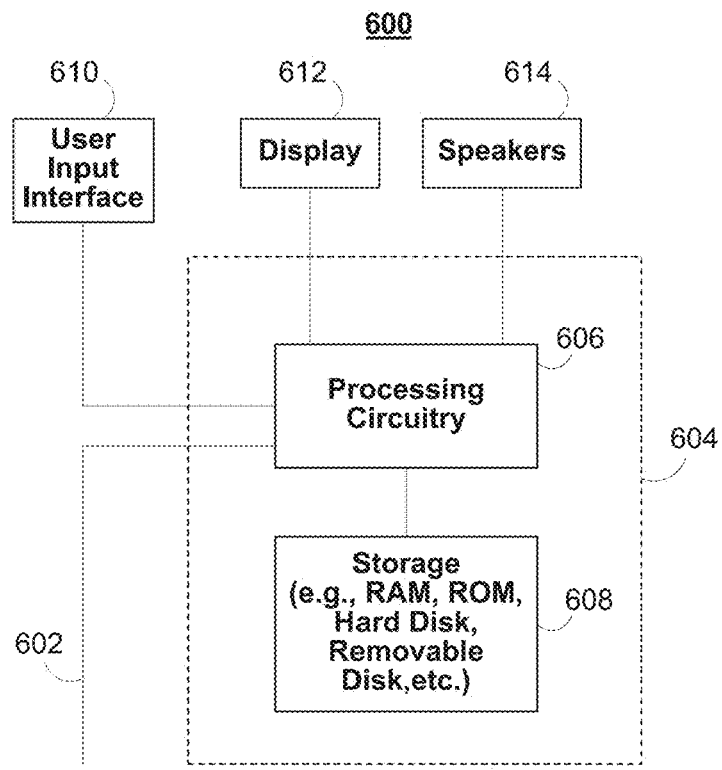
FIG. 6 is a block diagram of an illustrative user equipment device, in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
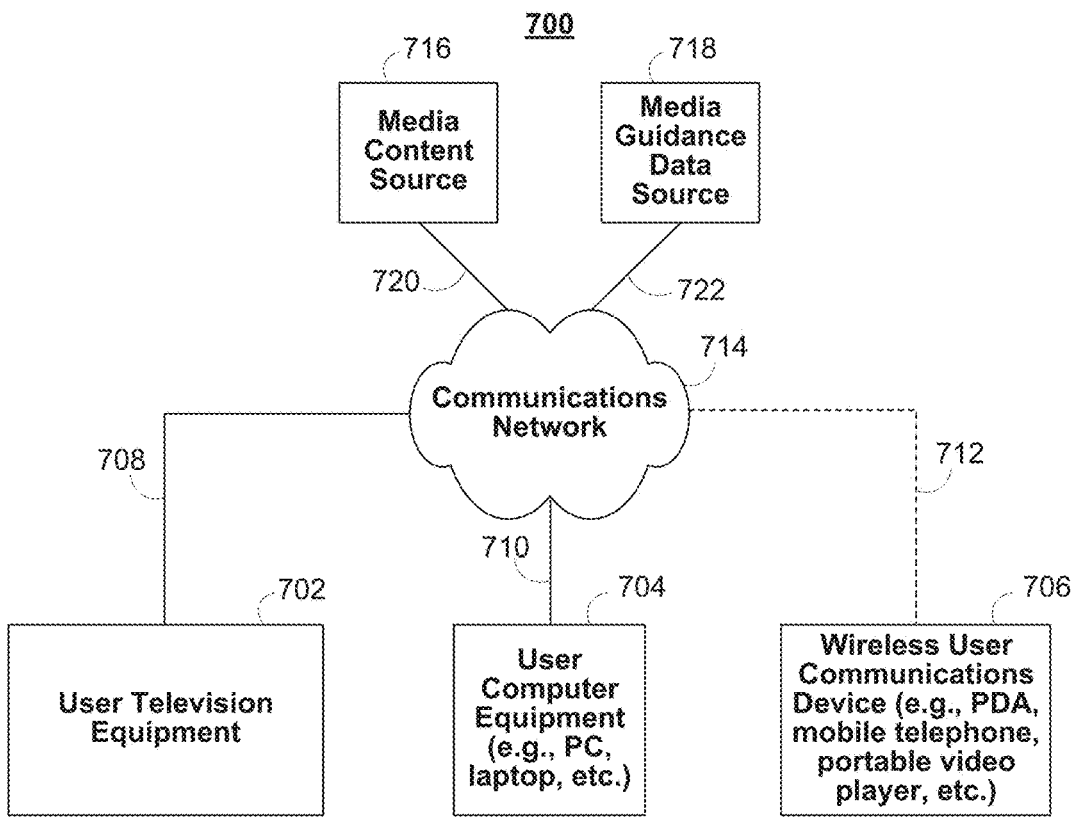
FIG. 7 is a block diagram of an illustrative media system, in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
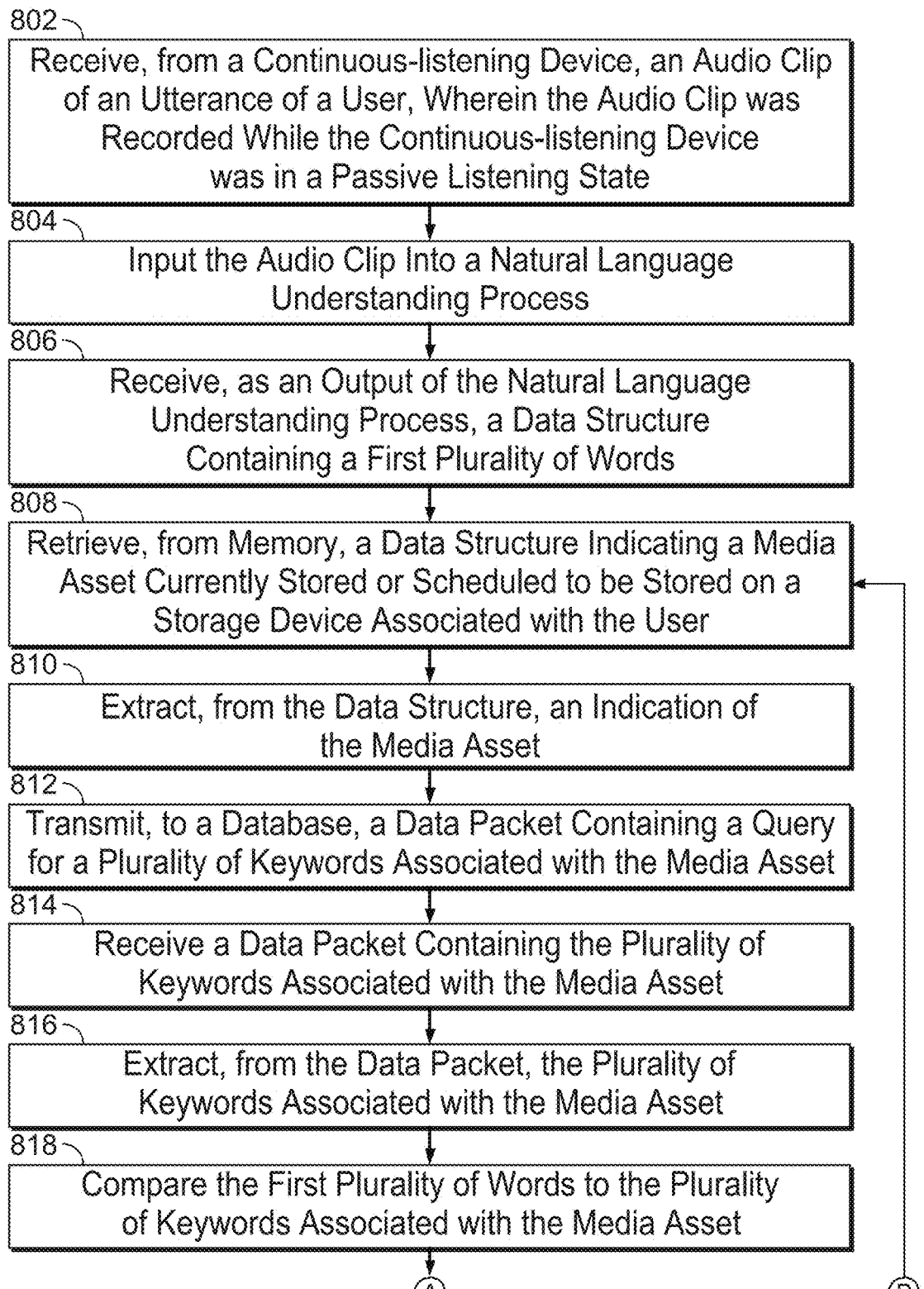
FIG. 8 is a flowchart of illustrative steps for changing a recording priority of a media asset using a continuous listening device, in accordance with some embodiments of the disclosure.
Figure 8:
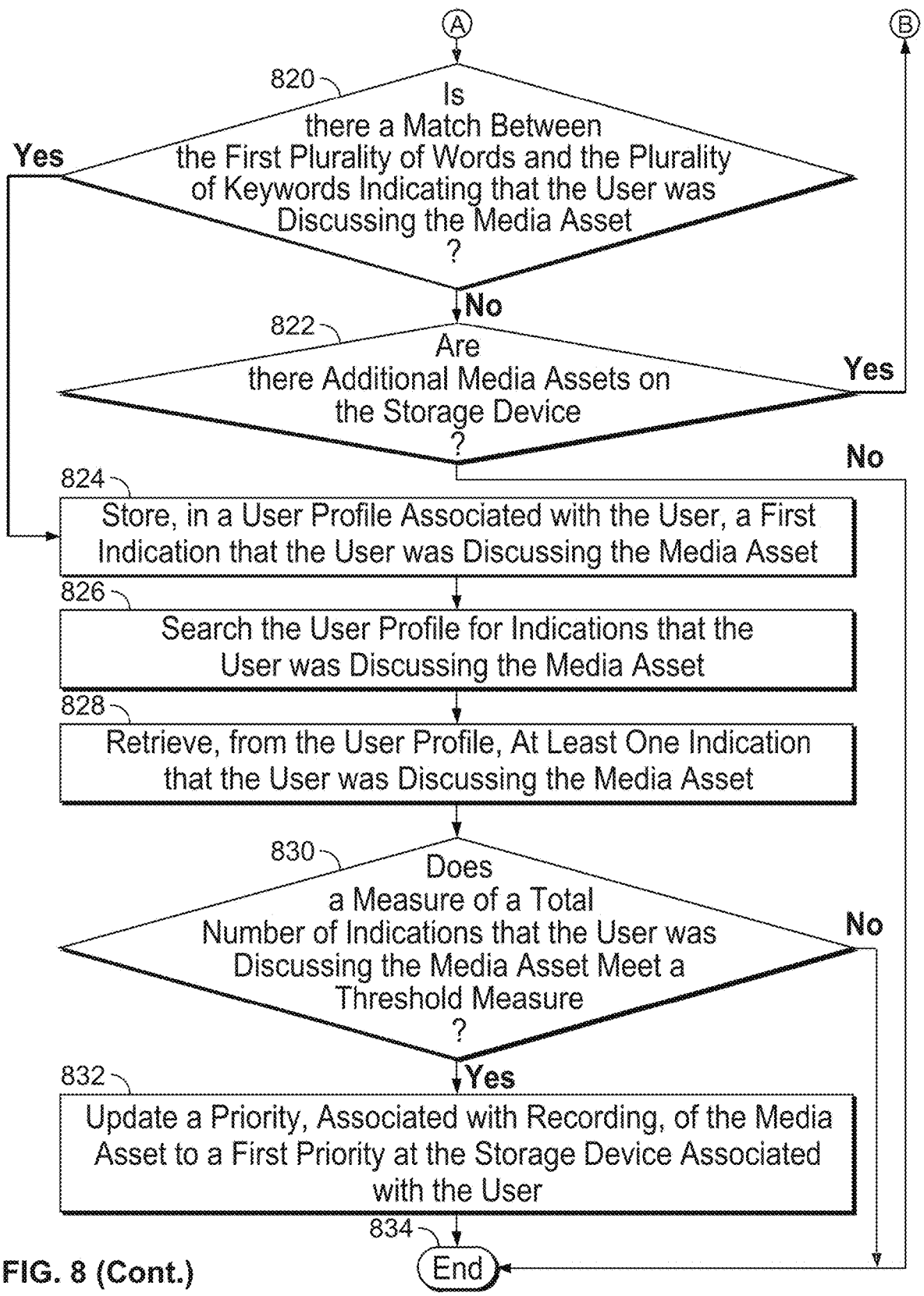

FIG. 8 is a flowchart of illustrative steps for changing a recording priority of a media asset using a continuous listening device, in accordance with some embodiments of the disclosure. For example, a media guidance application may instruct control circuitry 604 to execute the elements of process 800.

Process 800 begins at 802, where the media guidance application receives (e.g., via control circuitry 606), from a continuous-listening device (e.g., user input interface 610), an audio clip of an utterance of a user. The audio clip may have been recorded while the continuous-listening device was in a passive listening state. For example, the media guidance application may receive the audio clip of utterance 106 from continuous listening device 110 over communications link 112 as described in relation to FIG. 1.

Process 800 continues to 804, where the media guidance application inputs (e.g., via control circuitry 606) the audio clip into a natural language understanding process. For example, the media guidance application may input the audio clip of utterance 106 into a natural language processing accessed from memory (e.g., storage 608), or may transmit the audio clip to a remote server (e.g., media guidance data source 718) for processing, as discussed in relation to FIG. 1).

Process 800 continues to 806, where the media guidance application receives (e.g., via control circuitry 606), as an output of the natural language understanding process, a data structure containing a first plurality of words. For example, the media guidance application may receive, from the remote server (e.g., media guidance data source 718), the data structure containing the words "I," "love," "Tyrion," and "Lannister" corresponding to utterance 106 as described in relation to FIG. 1.

Process 800 continues to 808, where the media guidance application retrieves (e.g., via control circuitry 606), from memory (e.g., storage 608), a data structure indicating a media asset currently stored or scheduled to be stored on a storage device associated with the user. For example, the media guidance application may access data structure 202 indicating media asset 212 from memory as described in relation to FIG. 2.

Process 800 continues to 810, wherein the media guidance application extracts (e.g., via control circuitry 606), from the data structure, an indication of the media asset. For example, the media guidance application may extract, by executing an SQL script utilizing the declarative "Select" command, the title of media asset 212 from program information field 204 of data structure 202 as described in relation to FIG. 2.

Process 800 continues to 812, where the media guidance application transmits (e.g., via control circuitry 606), to a database (e.g., to media guidance application data source 718 over communications network 714), a data packet containing a query for a plurality of keywords associated with the media asset. For example, the media guidance application may transmit, to the database, a request for keywords 222 as described in relation to FIG. 2 above.

Process 800 continues to 814, where the media guidance application receives (e.g., via control circuitry 606 from media guidance data source 718 over communications network 718) a data packet containing the plurality of keywords associated with the media asset. For example, the media guidance application may receive a data packet containing keywords 222 as described in relation to FIG. 2 above. The data packet may include the entirety of data structure 202 as described in relation to FIG. 2 as well.

Process 800 continues to 816, where the media guidance application extracts (e.g., via control circuitry 606), from the data packet, the plurality of keywords associated with the media asset. For example, the media guidance application may extract, by executing an SQL script utilizing the declarative "Select" command, keywords 222 from the data packet, which may contain data structure 202, as described in relation to FIG. 2.

Process 800 continues to 818, where the media guidance application compares (e.g., via control circuitry 606) the first plurality of words to the plurality of keywords associated with the media asset. For example, the media guidance application may compare "I," "love," "Tyrion" and "Lannister," to the keywords "Blackwater," "Wildfire," "Battle," "Stannis," "Baratheon," "Tyrion," "Joffry," "Cersei," "Tywin," "Lannister," "Kings," "Landing," "Red," and "Keep" (e.g., keywords 222 of FIG. 2).

Process 800 continues to 820, where the media guidance application determines (e.g., via control circuitry 606) if there is a match between the first plurality of words and the plurality of keywords indicating that the user was discussing the media asset. If the media guidance application determines that there is not a match between the first plurality of words and the plurality of keywords indicating that the user was discussing the media asset, process 800 continues to 822, where the media guidance application determines (e.g., via control circuitry 606) if there are additional media assets on the storage device. For example, if the media guidance application determines that there is not a match between the keywords associated with a second media asset (e.g., the eighth episode of the second season of "Bob's Burgers" entitled "Bad Tina"), the media guidance application may determine if there are additional media assets to check. If the media guidance application determines that there are additional media assets on the storage device, process 800 returns to 808, where a new data structure indicating a new media asset is retrieved. For example, the media guidance application may retrieve (e.g., via control circuitry 606 from storage 618) the data structure indicating "Blackwater" as described above. If the media guidance application determines that there are no additional media assets on the storage device, process 800 continues to 834, where process 800 ends.

If, at 820, the media guidance application determines that there is a match between the first plurality of words and the plurality of keywords indicating that the user was discussing the media asset, process 800 continues to 824, where the media guidance application stores (e.g., via control circuitry 606 in storage 608) in a user profile associated with the user, a first indication that the user was discussing the media asset. For example, the media guidance application may store in a user profile associated with user 102 a first indication that user 102 was discussing "Blackwater" as described in relation to FIG. 1 above.

Process 800 continues to 826 where the media guidance application searches (e.g., via control circuitry 606) the user profile for indications that the user was discussing the media asset. For example, the media guidance application may search the user profile associated with user 102 for indications that user 102 was discussing "Blackwater" as described in relation to FIG. 1 above, and as described in more detail below in relation to FIG. 12.

Process 800 continues to 828 where the media guidance application retrieves (e.g., via control circuitry 606 from storage 608), from the user profile, at least one indication that the user was discussing the media asset. For example, the media guidance application may retrieve, from the user profile associated with user 102, five indications that user 102 was discussing "Blackwater" as described above in relation to FIG. 1.

Process 800 continues to 830, where the media guidance application determines (e.g., via control circuitry 606) whether a measure of a total number of indications that the user was discussing the media asset meets a threshold measure. For example, the media guidance application may compare (e.g., via control circuitry 606) the measure of the total number of indications that user 102 discussed "Blackwater," which may be six times (the five indications that user 102 discussed "Blackwater" plus the first indication that the user discussed "Blackwater" in the audio clip of utterance 106) to a threshold measure of the user discussing the media asset six to ten times. If the media guidance application determines (e.g., via control circuitry 606) that the measure does not meet the threshold measure, process 800 continues to 834, where process 800 ends.

If, at 830, the media guidance application determines (e.g., via control circuitry 606) that the measure meets the threshold measure, process 800 continues to 832, where the media guidance application updates (e.g., via control circuitry 606) a priority, associated with recording, of the media asset to a first priority at the storage device associated with the user. For example, the media guidance application may update the priority to "Must Have" as described in relation to FIG. 1, and as described in more detail below in relation to FIG. 12. Process 800 continues to 834, where process 800 ends.

Figure 9:
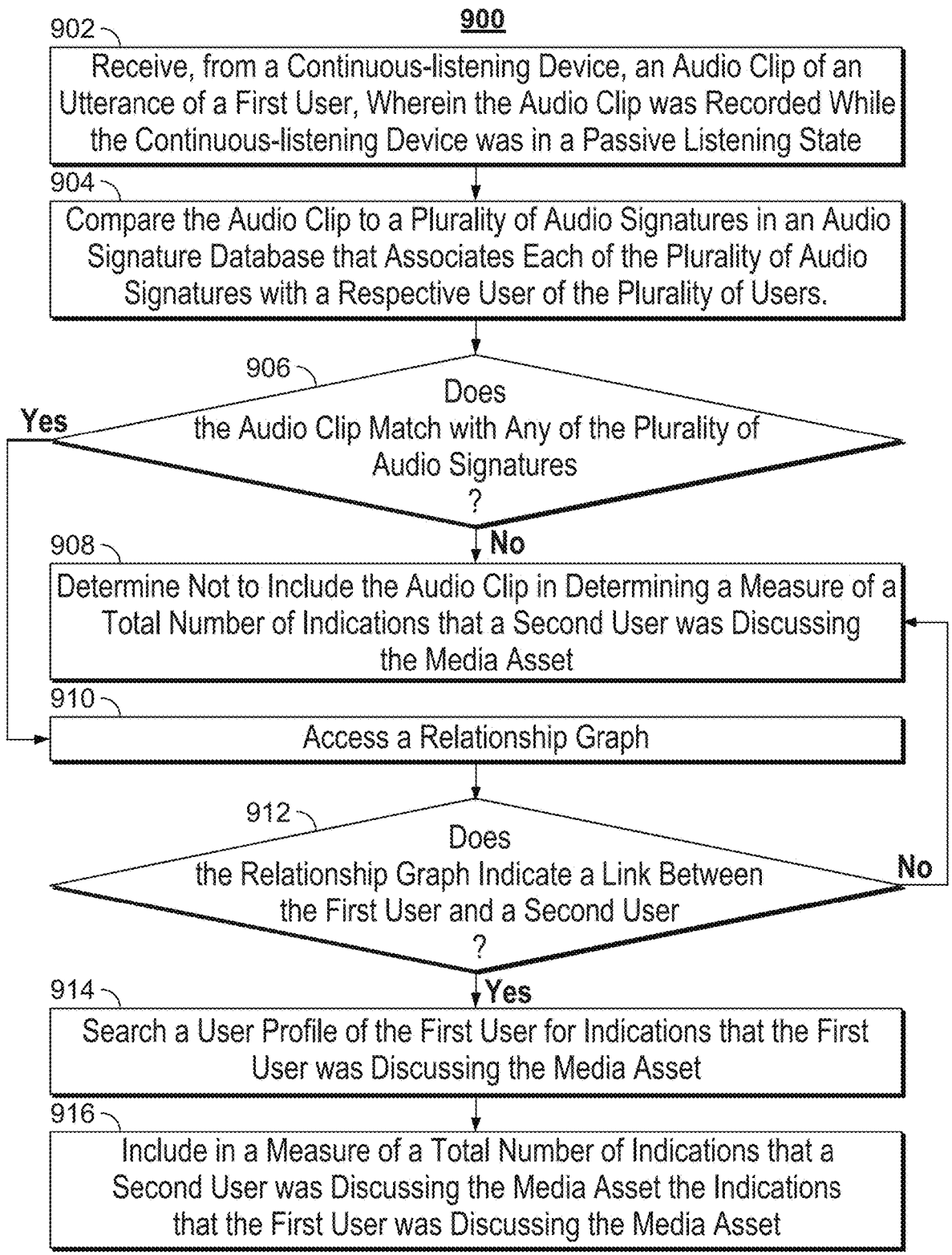
FIG. 9 is a flowchart of illustrative steps for determining whether to include an audio clip in a measure of how many times a user discussed a media asset, in accordance with some embodiments of the disclosure.

FIG. 9 is a flowchart of illustrative steps for determining whether to include an audio clip in a measure of how many times a user discussed a media asset, in accordance with some embodiments of the disclosure. For example, a media guidance application may instruct control circuitry 604 to execute the elements of process 900.

Process 900 begins at 902, where the media guidance application receives (e.g., via control circuitry 606), from a continuous-listening device, an audio clip of an utterance of a first user. The audio clip may have been recorded while the continuous-listening device was in a passive listening state. For example, the media guidance application may receive, from continuous listening device 110 over communications link 112, an audio clip of utterance 108 of user 104, as described in relation to FIG. 1.

Process 900 continues to 904, where the media guidance application compares (e.g., via control circuitry 606) the audio clip to a plurality of audio signatures (e.g., stored in storage 608) in an audio signature database that associates each of the plurality of audio signatures with a respective user of the plurality of users. For example, the media guidance application may compare the audio clip of utterance 108 to the plurality of audio signatures, as described above in relation to FIG. 1 in relation to including only audio clips that contain recognized voices in the measure of the total number of indications that user 102 was discussing the first media asset.

Process 900 continues to 906, where the media guidance application determines (e.g., via control circuitry 606) whether the audio clip matches any of the plurality of audio signatures. If the media guidance application determines that the audio clip does not match any of the plurality of audio signatures, process 900 continues to 908, where the media guidance application determines (e.g., via control circuitry 606) not to include the audio clip in determining a measure of a total number of indications that a second user was discussing the media asset. For example, if the first user was the mail man, his voice may not be registered in the plurality of audio signatures, and thus the audio clip received from the mail man may not be included in the measure of a total number of indications that user 102 was discussing the media asset, as described above in relation to FIG. 1.

If, at 906, the media guidance application determines that the audio clip does match with one of the plurality of audio signatures, process 900 continues to 910, where the media guidance application accesses (e.g., via control circuitry 606 from storage 608) a relationship graph. For example, the relationship graph may indicate relationships between the first user and a plurality of users, and a second user and a plurality of users.

Process 900 continues to 912, where the media guidance application determines whether the relationship graph indicates a link between the first user and a second user. For example, the media guidance application may determine whether a link exists between user 104 and user 102 in the relationship graph, as described in relation to FIG. 1 above.

If the media guidance application determines that a link does not exist between the first user and the second user (e.g., user 102 and user 104), process 900 continues to 908, where the media guidance application determines (e.g., via control circuitry 606) not to include the audio clip in determining a measure of a total number of indications that a second user was discussing the media asset. If, instead, at 912, the media guidance application determines that a link exists between the first user and the second user, process 900 continues to 914, where the media guidance application searches (e.g., via control circuitry 606) a user profile (e.g., stored in storage 608) of the first user for indications that the first user was discussing the media asset. For example, the media guidance application may search the user profile associated with user 104 for indications that the first user was discussing "Blackwater," as described above in relation to FIG. 1 and as described in further detail below in FIG. 11.

Process 900 continues to 916, where the media guidance application includes (e.g., via control circuitry 606), in a measure of a total number of indications that a second user was discussing the media asset, the indications that the second user was discussing the media asset. For example, the media guidance application may include a fraction of the total number of indications that user 104 was discussing "Blackwater" (e.g., one fourth of four indications) in a measure of a total number of indications that user 102 was discussing the media asset (e.g., to increase the measure from six to seven) as described above in relation to FIG. 1.

Figure 10:
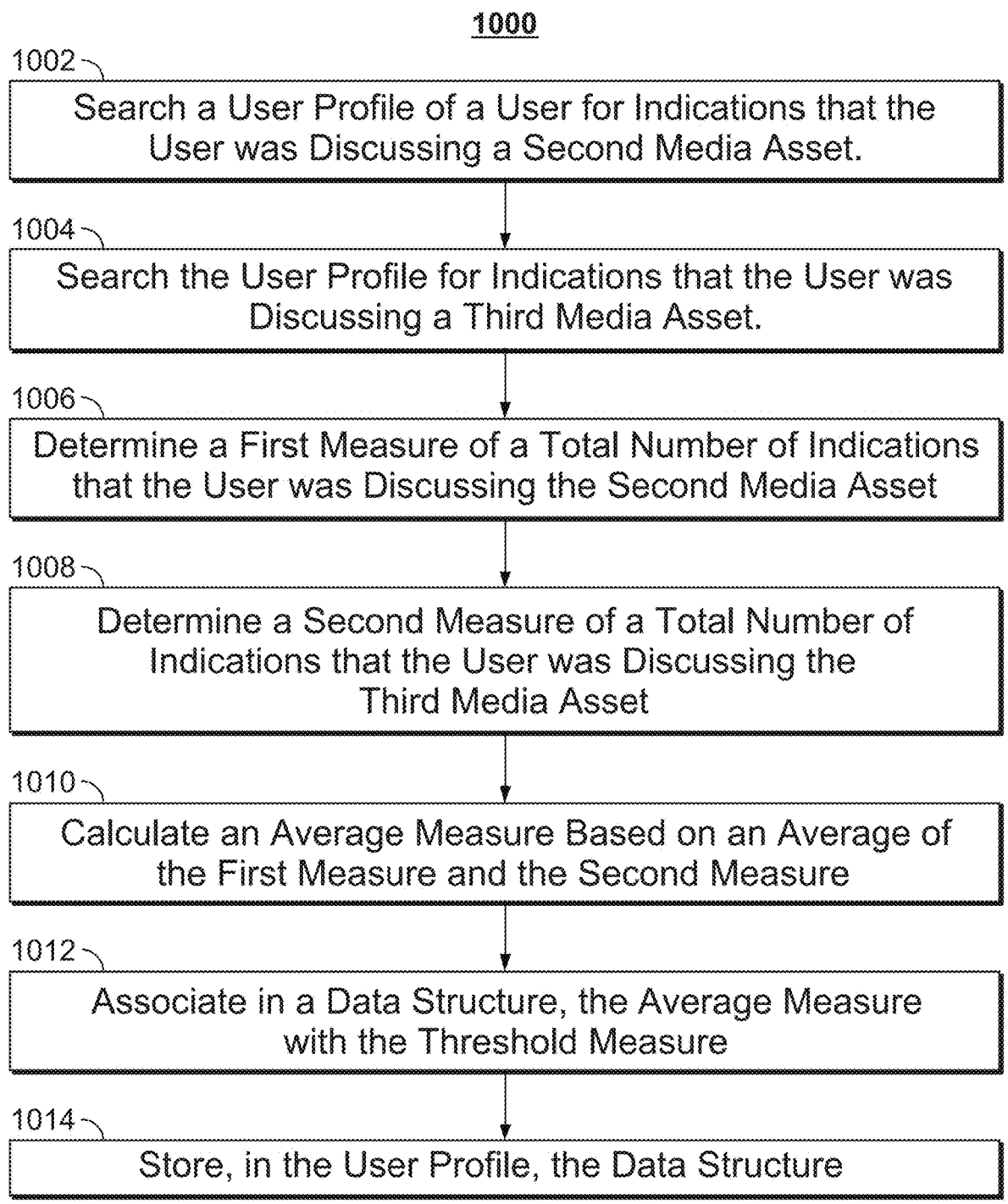
FIG. 10 is a flowchart of illustrative steps for determining a threshold measure, in accordance with some embodiments of the disclosure.

FIG. 10 is a flowchart of illustrative steps for determining a threshold measure, in accordance with some embodiments of the disclosure. For example, a media guidance application may instruct control circuitry 604 to execute the elements of process 1000.

Process 1000 begins at 1002, where the media guidance application searches (e.g., via control circuitry 606) a user profile of a user for indications that the user was discussing a second media asset. For example, the media guidance application may search for indications that the user discussed the thirteenth episode of the fourth season of the series "Breaking Bad," entitled "Face Off," as described above in relation to FIG. 3 and determining the average measure, and as described in more detail below in FIG. 11.

Process 1000 continues to 1004, where the media guidance application searches (e.g., via control circuitry 606) the user profile of the user for indications that the user was discussing a third media asset. For example, the media guidance application may search for indications that the user discussed the eighth episode of the second season of "Bob's Burgers" entitled "Bad Tina" as described above in relation to FIG. 3 and determining the average measure, as described in more detail below in FIG. 11.

Process 1000 continues to 1006, where the media guidance application determines (e.g., via control circuitry 606) a first measure of a total number of indications that the user was discussing the second media asset. For example, the media guidance application may determine that the first measure is ten, as described above in relation to FIG. 3.

Process 1000 continues to 1008, where the media guidance application determines (e.g., via control circuitry 606) a second measure of a total number of indications that the user was discussing the third media asset. For example, the media guidance application may determine that the second measure is two, as described above in relation to FIG. 3.

Process 1000 continues to 1010, where the media guidance application calculates (e.g., via control circuitry 606) an average measure based on an average of the first measure and the second measure. For example, the media guidance application may determine that the average measure is an average of the first measure, the second measure, and a plurality of measures, which may be six, as described above in relation to FIG. 3.

Process 1000 continues to 1012, where the media guidance application associates (e.g., via control circuitry 606) in a data structure, the average measure with a threshold measure. For example, the media guidance application may associate the average measure with the third of instances measures 304 in table 302, as described in relation to FIG. 3.

Process 1000 continues to 1014, where the media guidance application stores (e.g., via control circuitry 606 in storage 608), in the user profile, the data structure. For example, the media guidance application may store, in the user profile of user 102, table 302 associating instances measures 304 with recording priorities 310 and deletion priorities 312 as described in relation to FIG. 3 above.

Figure 11:
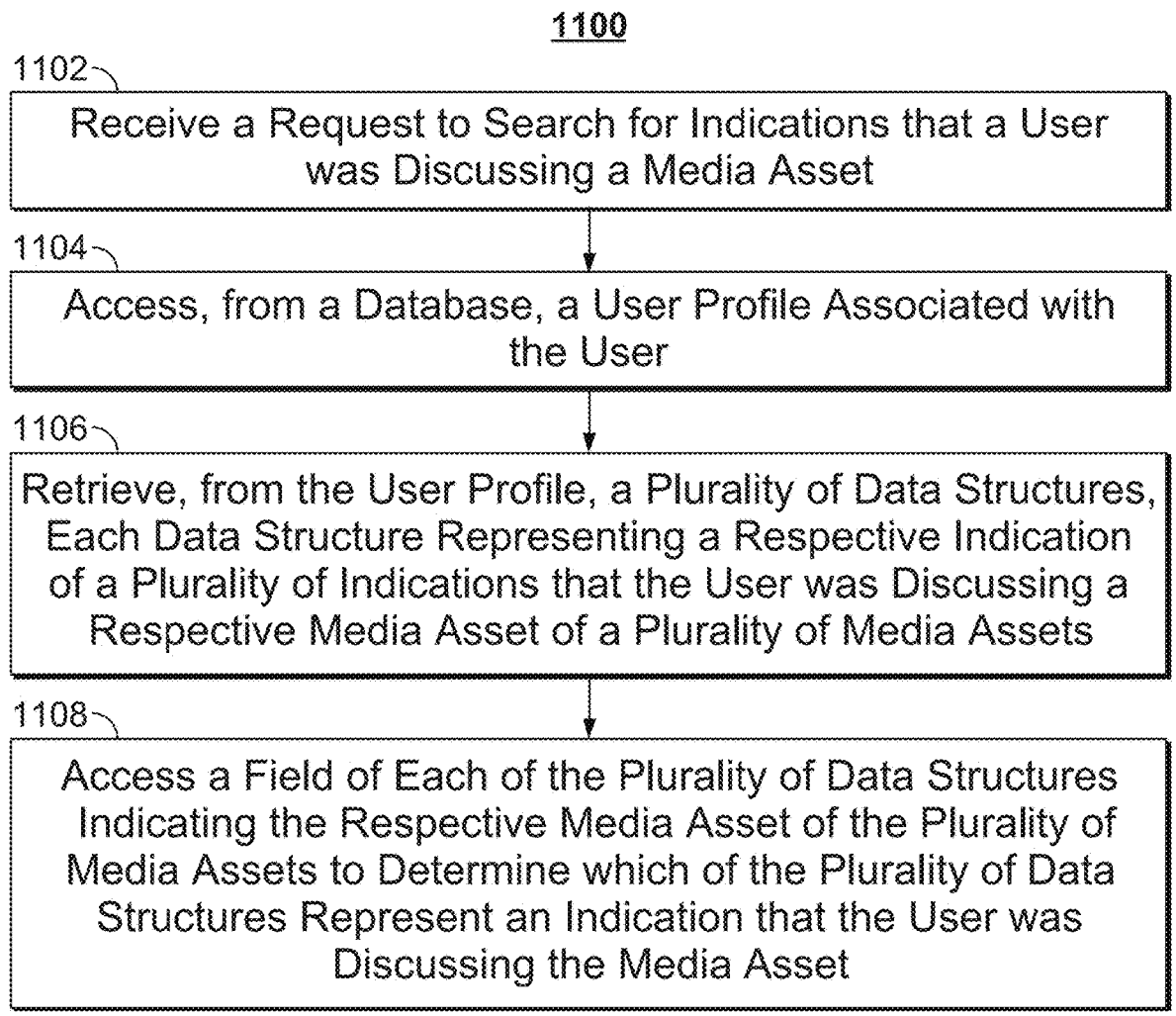
FIG. 11 is a flowchart of illustrative steps for searching for indications that a user was discussing a media asset, in accordance with some embodiments of the disclosure.

FIG. 11 is a flowchart of illustrative steps for searching for indications that a user was discussing a media asset, in accordance with some embodiments of the disclosure. For example, a media guidance application may instruct control circuitry 604 to execute the elements of process 1100.

Process 1100 begins at 1102, where the media guidance application receives (e.g., via control circuitry 606 over communications network 714) a request to search for indications that a user was discussing a media asset. For example, the media guidance application may receive a query identifying a user (e.g., user 102) and a media asset (e.g., "Blackwater") and a request to search for indications that the user was discussing the media asset.

Process 1100 continues to 1104, where the media guidance application accesses (e.g., via control circuitry 606) from a database (e.g., media guidance data source 718 or storage 608), a user profile associated with the user. For example, the media guidance application may query the database for the user profile associated with user 102, as described above in relation to FIG. 1.

Process 1100 continues to 1106, where the media guidance application retrieves (e.g., via control circuitry 606 from storage 608) a plurality of data structure. Each data structure may represent a respective indication of a plurality of indications that the user was discussing a respective media asset of a plurality of media assets. For example, the media guidance application may retrieve four data structures. A first data structure may indicate that the user was discussing "Blackwater," a second data structure may indicate that the user was discussing "Bad Tina," a third data structure may indicate that the user was discussing "Face Off," and a fourth data structure may indicate that the user was discussing "Blackwater."

Process 1100 continues to 1108, where the media guidance application accesses (e.g., via control circuitry 606) a field of each of the plurality of data structures indicating the respective media asset of the plurality of media assets to determine which of the plurality of data structures represents an indication that the user was discussing the media asset. For example, the media guidance application may access a field of the first data structure indicating "Blackwater," a field of the second data structure indicating "Bad Tina," a field of the third data structure indicating "Face Off," and a field of the fourth data structure indicating "Blackwater." The media guidance application may determine that the first data structure and the fourth data structure have a field indicating "Blackwater" by comparing the media asset in the request to search for indication that the user was discussing "Blackwater," and thus determine that the first data structure and the fourth data structure represent an indication that the user was discussing "Blackwater."

Figure 12:
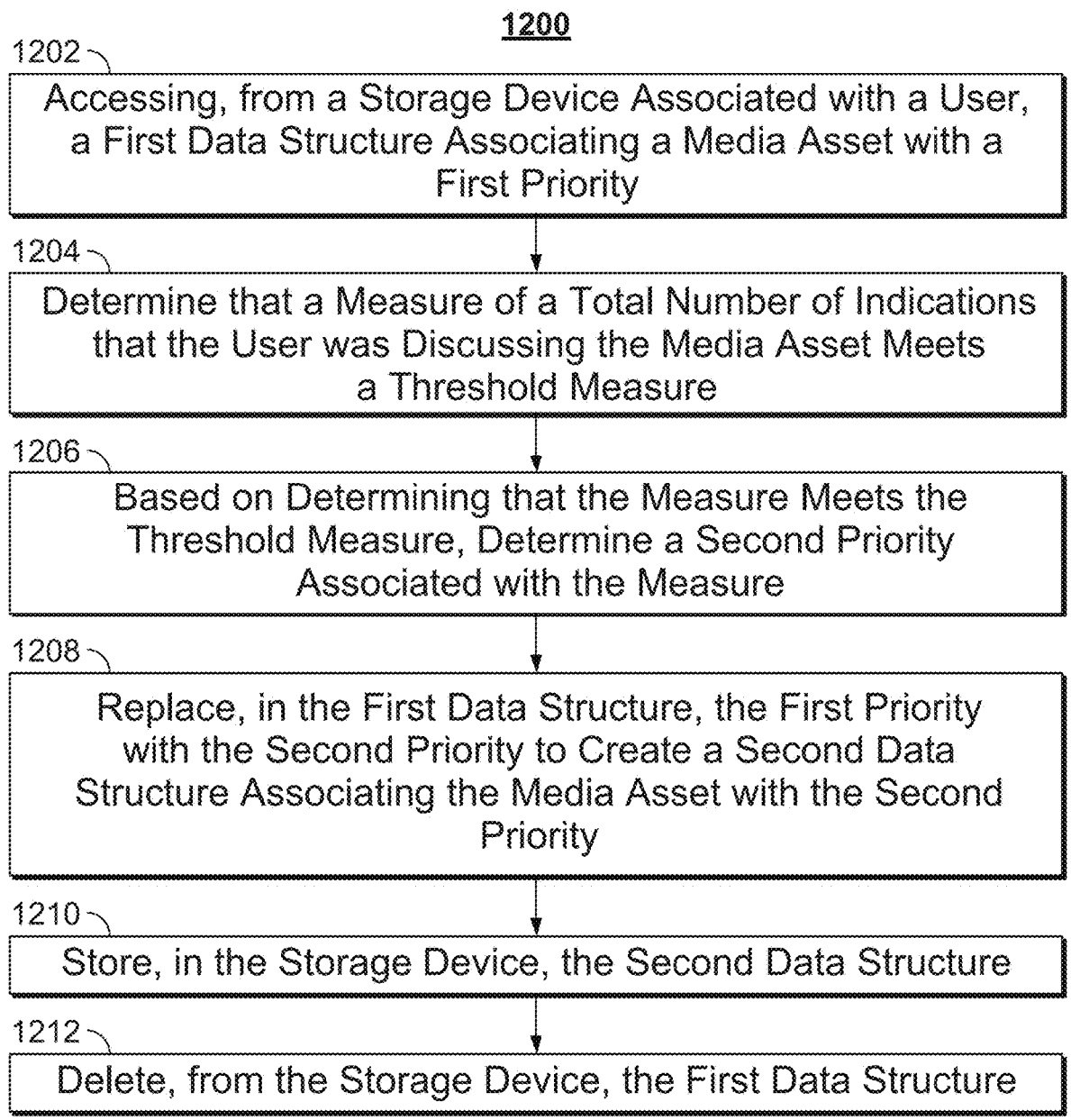
FIG. 12 is a flowchart of illustrative steps for updating a priority of a media asset, in accordance with some embodiments of the disclosure.

FIG. 12 is a flowchart of illustrative steps for updating a priority of a media asset, in accordance with some embodiments of the disclosure. For example, a media guidance application may instruct control circuitry 604 to execute the elements of process 1200.

Process 1200 begins at 1202, where the media guidance application accesses (e.g., via control circuitry 606), from a storage device associated with the user (e.g., storage 608 of user television equipment 702), a first data structure associating a media asset with a first priority. For example, the media guidance application may retrieve data structure 202 from memory, which associated media asset 212 with old priority 218 of "Delete First" as described in relation to FIG. 2.

Process 1200 continues to 1204, where the media guidance application determines (e.g., via control circuitry 606) that a measure of a total number of indications that the user was discussing the media asset meets a threshold measure. For example, the media guidance application may determine that the measure of 11 meets a threshold measure of greater than ten, as described above in 830 of process 800 in FIG. 8.

Process 1200 continues to 1206, where the media guidance application determines (e.g., via control circuitry 606) a second priority associated with the measure based on determining that the measure meets the threshold measure. For example, the media guidance application may access table 302 to determine that the threshold measure meets the fourth of instances thresholds 304, and determine that the fourth of deletion priorities 310, "Must Have," is associated with the threshold measure of greater than ten as they are in the same row of table 302, as described above in relation to FIG. 3.

Process 1200 continues to 1208, where the media guidance application replaces (e.g., via control circuitry 606), in the first data structure, the first priority with the second priority to create a second data structure associating the media asset with the second priority. For example, the media guidance application may replace old priority 218 with new priority 220 in data structure 202 indicating media asset 212, which may be the second priority of "Must Have," thereby creating the second data structure associating media asset 212 with new priority 220.

Process 1200 continues to 1210, where the media guidance application stores (e.g., via control circuitry 606), in the storage device (e.g., storage 608 of user television equipment 702), the second data structure. For example, the media guidance application may store data structure 202 associating new priority 220 with media asset 212 in storage, as described above in relation to FIG. 2.

Process 1200 continues to 1212, where the media guidance application deletes (e.g., via control circuitry 606), from the storage device (e.g., storage 608 of user television equipment 702), the first data structure. For example, the media guidance application may delete data structure 202 associating old priority 218 with media asset 212 in storage, as described above in relation to FIG. 2.

The above-described embodiments of the present disclosure are presented for purposes of illustration and not of limitation, and the present disclosure is limited only by the claims that follow. Additionally, it should be noted that any of the devices or equipment discussed in relation to FIGS. 6-7 could be used to perform one or more of the steps in processes 800-1200 in FIGS. 8-12, respectively. Furthermore, it should be noted that the features and limitations described in any one embodiment may be applied to any other embodiment herein, and flowcharts or examples relating to one embodiment may be combined with any other embodiment in a suitable manner, done in different orders, performed with additional steps, performed with omitted steps, or done in parallel. For example, each of these steps may be performed in any order or in parallel or substantially simultaneously to reduce lag or increase the speed of the system or method. In addition, the systems and methods described herein may be performed in real time. It should also be noted that the systems and/or methods described above may be applied to, or used in accordance with, other systems and/or methods.

What is claimed is:

1. A method for adjusting a recording priority of a media asset based on a conversation pertaining to the media asset, the method comprising:
   parsing an utterance received at a continuous listening device to extract a first plurality of words;
   determining, based on the parsing, whether the utterance comprises an instruction for the continuous listening device;
   in response to determining that the utterance does not comprise the instruction for the continuous listening device:
      identifying an indication of a media asset in a data structure comprising (1) indications of media assets scheduled for storage in a storage device and (2) recording priorities for the media assets, wherein the recording priority of a respective media asset indicates the importance of storage of the respective media asset; and
      retrieving a plurality of keywords associated with the media asset;
   comparing the first plurality of words to the plurality of keywords to determine whether a match exists between the first plurality of words and the plurality of keywords; and
   in response to determining that a match exists:
      storing, in a user profile, a first indication that the utterance refers to the media asset;
      searching the user profile for additional indications of utterances referring to the media asset;
      based on searching the user profile, retrieving, from the user profile, at least one additional indication of an utterance referring to the media asset;
      determining, based on the at least one indication, a measure of a total number of indications by:
         extracting, from the at least one indication, a first timestamp;
         calculating an amount of time between a first time corresponding to the first timestamp and a second time, wherein the second time is when the utterance was received; and
         calculating a frequency at which utterances refer to the media asset based on both the amount of time and a number of timestamps corresponding to times between the first time and the second time; and
      updating, in the data structure, a recording priority of the media asset based on the measure.

2. The method of claim 1, wherein determining whether there is the match comprises determining whether at least one of the first plurality of words matches at least one of the plurality of keywords, and wherein the match indicates that the utterance refers to the media asset.

3. The method of claim 1, wherein updating the recording priority of the media asset comprises:
   determining whether the measure meets a threshold measure; and
   in response to determining that the measure meets the threshold measure, updating the recording priority.

4. The method of claim 1, further comprising:
   determining that the utterance has a negative context;
   storing an indication of the utterance in a user profile;
   determining, from the user profile, a measure of a total number of indications of utterances referring to the media asset, wherein a first subset of the total number comprises indications associated with a positive context and a second subset of the total number comprises indications associated with the negative context; and
   comparing the first subset of indications associated with the positive context with the second subset of indications associated with the negative context;
   wherein updating the recording priority of the media asset further comprises adjusting the recording priority based on the comparing the first subset of indications associated with the positive context with the second subset of indications.

5. The method of claim 4, wherein determining that the utterance has the negative context comprises:
comparing the first plurality of words to a negative word database, wherein the negative word database comprises at least one data structure indicating negative words; and
determining that at least one word of the first plurality of words is contained in the negative word database.

6. The method of claim 4, wherein determining that the utterance has the negative context comprises:
comparing the utterance to a tone database to determine a tone of the utterance, wherein the tone of the utterance is a non-etymological indication of whether the utterance refers to the media asset positively or negatively; and
determining that the tone of the utterance is a negative tone based on comparing the utterance to the tone database.

7. The method of claim 1, wherein updating the recording priority of the media asset further comprises:
storing an indication of the utterance in a user profile;
determining, from the user profile, a measure of a total number of indications of utterances referring to the media asset;
accessing, from memory, a table associating a plurality of threshold measures with a plurality of priorities, wherein each threshold measure of the plurality of threshold measures is associated with a respective priority;
comparing the measure to the plurality of threshold measures;
determining, based on the comparing, a respective priority of the plurality of priorities that corresponds to the threshold measure; and
updating the recording priority to the associated priority.

8. The method of claim 1, further comprising:
comparing the utterance to a plurality of audio signatures in an audio signature database to determine which of a plurality of users spoke in the utterance, wherein the audio signature database associates each of the plurality of audio signatures with a respective user of the plurality of users;
in response to determining that the utterance matches an audio signature of a user from the plurality of users based on the comparing, retrieving the user profile of the user; and
storing, in the user profile, a first indication that the utterance of the user refers to the media asset.

9. The method of claim 1 further comprising controlling deletion of the media asset and resolving storage conflicts with the media asset based on the recording priority of the media asset.

10. A system for adjusting a recording priority of a media asset based on a conversation pertaining to the media asset, the system comprising:
control circuitry configured to:
parse an utterance received at a continuous listening device to extract a first plurality of words;
determine, based on the parsed utterance, whether the utterance comprises an instruction for the continuous listening device;
in response to the determination that the utterance does not comprise the instruction for the continuous listening device:
identify an indication of a media asset in a data structure comprising (1) indications of media assets scheduled for storage in a storage device and (2) recording priorities for the media assets, wherein the recording priority of a respective media asset indicates the importance of storage of the respective media asset; and
retrieve a plurality of keywords associated with the media asset;
compare the first plurality of words to the plurality of keywords to determine whether a match exists between the first plurality of words and the plurality of keywords; and
in response to determining that a match exists:
store, in a user profile, a first indication that the utterance refers to the media asset:
search the user profile for additional indications of utterances referring to the media asset;
based on searching the user profile, retrieve, from the user profile, at least one additional indication of an utterance referring to the media asset;
determine, based on the at least one indication, a measure of a total number of indications by:
extracting, from the at least one indication, a first timestamp;
calculating an amount of time between a first time corresponding to the first timestamp and a second time, wherein the second time is when the utterance was received; and
calculating a frequency at which utterances refer to the media asset based on both the amount of time and a number of timestamps corresponding to times between the first time and the second time; and
update, in the data structure, a recording priority of the media asset based on the measure.

11. The system of claim 10, wherein the control circuitry is further configured to determine whether there is the match by determining whether at least one of the first plurality of words matches at least one of the plurality of keywords, and wherein the match indicates that the utterance refers to the media asset.

12. The system of claim 10, wherein the control circuitry is further configured to update the recording priority of the media asset by:
determining whether the measure meets a threshold measure; and
in response to determining that the measure meets the threshold measure, updating the recording priority.

13. The system of claim 10, wherein the control circuitry is further configured to:
determine that the utterance has a negative context;
store an indication of the utterance in a user profile;
determine, from the user profile, a measure of a total number of indications of utterances referring to the media asset, wherein a first subset of the total number comprises indications associated with a positive context and a second subset of the total number comprises indications associated with the negative context;
determine whether the first subset of indications associated with the positive context is larger than the second subset of indications associated with the negative context;
in response to determining that the first subset is not larger than the second subset, decrease the recording priority; and in response to determining that the first subset is larger than the second subset, increase the recording priority.

14. The system of claim 13, wherein the control circuitry is further configured to determine that the utterance has the negative context by:
   comparing the first plurality of words to a negative word database, wherein the negative word database comprises at least one data structure indicating negative words; and
   determining that at least one word of the first plurality of words is contained in the negative word database.

15. The system of claim 13, wherein the control circuitry is further configured to determine that the utterance has the negative context by:
   comparing the utterance to a tone database to determine a tone of the utterance, wherein the tone of the utterance is a non-etymological indication of whether the utterance refers to the media asset positively or negatively; and
   determining that the tone of the utterance is a negative tone based on comparing the utterance to the tone database.

16. The system of claim 10, wherein the control circuitry is further configured to update the recording priority of the media asset by:
   storing an indication of the utterance in a user profile;
   determining, from the user profile, a measure of a total number of indications of utterances referring to the media asset;
   accessing, from memory, a table associating a plurality of threshold measures with a plurality of priorities, wherein each threshold measure of the plurality of threshold measures is associated with a respective priority;
   comparing the measure to the plurality of threshold measures;
   determining, based on the comparison, a respective priority of the plurality of priorities that corresponds to the threshold measure; and
   updating the recording priority to the respective priority.

17. The system of claim 10, wherein the control circuitry is further configured to:
   compare the utterance to a plurality of audio signatures in an audio signature database to determine which of a plurality of users spoke in the utterance, wherein the audio signature database associates each of the plurality of audio signatures with a respective user of the plurality of users;
   in response to the determination that the utterance matches an audio signature of a user from the plurality of users based on the comparing, retrieve the user profile of the user; and
   store, in the user profile, a first indication that the utterance of the user refers to the media asset.

18. The system of claim 10 wherein the control circuitry is further configured to control deletion of the media asset and resolve storage conflicts with the media asset based on the recording priority of the media asset.

* * * * *